(12) United States Patent
Hambrose et al.

(10) Patent No.: US 12,380,166 B2
(45) Date of Patent: Aug. 5, 2025

(54) PROCESS FLOW DATA PARAMETERS

(71) Applicant: Zenda, LLC, New York, NY (US)

(72) Inventors: Harold Hambrose, New York, NY (US); Scott Dombkowski, Brooklyn, NY (US); Max Stropkay, Queens, NY (US)

(73) Assignee: Zenda, LLC, New York, NY (US)

( * ) Notice: Subject to any disclaimer, the term of this patent is extended or adjusted under 35 U.S.C. 154(b) by 0 days.

(21) Appl. No.: 18/611,297

(22) Filed: Mar. 20, 2024

(65) Prior Publication Data

US 2024/0256609 A1     Aug. 1, 2024

Related U.S. Application Data

(63) Continuation-in-part of application No. 18/392,554, filed on Dec. 21, 2023.

(60) Provisional application No. 63/458,306, filed on Apr. 10, 2023, provisional application No. 63/435,634, filed on Dec. 28, 2022.

(51) Int. Cl.
    *G06F 16/901*      (2019.01)
    *G06F 16/9038*      (2019.01)

(52) U.S. Cl.
    CPC ...... *G06F 16/9024* (2019.01); *G06F 16/9038* (2019.01)

(58) Field of Classification Search
    CPC ........... G06F 16/90241; G06F 16/9038; G06F 16/9024
    USPC .................................................. 707/703, 798
See application file for complete search history.

(56) References Cited

U.S. PATENT DOCUMENTS

| | | | |
|---|---|---|---|
| 7,337,412 B2 | 2/2008 | Guido et al. | |
| 2004/0125152 A1 | 7/2004 | Sommers et al. | |
| 2007/0092783 A1* | 4/2007 | Gibbons | ............ G06Q 10/0631 705/7.26 |
| 2015/0356243 A1* | 12/2015 | Andreassen | ........... G16B 20/40 702/20 |
| 2016/0278652 A1* | 9/2016 | Kaib | .................... A61N 1/0484 |
| 2018/0005234 A1 | 1/2018 | Van Leuven et al. | |
| 2018/0174060 A1* | 6/2018 | Velez-Rojas | ............. G06N 5/02 |
| 2018/0241623 A1* | 8/2018 | Ma | .......................... H04L 67/63 |
| 2019/0026286 A1* | 1/2019 | Zhang | ................. G06F 3/04845 |
| 2019/0028445 A1* | 1/2019 | McLaughlin | ....... H04L 63/0428 |
| 2021/0081905 A1 | 3/2021 | Hamilton et al. | |
| 2022/0035794 A1* | 2/2022 | Mahadik | ............. G06F 16/2379 |

OTHER PUBLICATIONS

, International Search Report and Written Opinion for PCT/US2023/086044, Apr. 10, 2024, 17 pages.

* cited by examiner

*Primary Examiner* — Kuen S Lu
(74) *Attorney, Agent, or Firm* — Charney IP Law LLC; Thomas M. Finetti

(57) ABSTRACT

A network system that associates data traits and characteristics of a hierarchical arrangement of process elements within a process model application. The hierarchical arrangement organizes a process flow into enterprise hierarchy structures. The system will automatically receive data related to traits and create characteristics that allows the system to measure and utilize qualitative aspects of the process. The system creates user interface displays of the characteristics data to inform user decisions.

21 Claims, 24 Drawing Sheets

| # | NAME | DESCRIPTION | CATEGORY | ACTIVE | OWNER | CUSTOM 1 | CUSTOM 2 | CUSTOM 3 |
|---|---|---|---|---|---|---|---|---|
| 1 | Application Risk Form | Document capturing potential risks associated with an application's details. | Data Form | ✓ | [Content] | [Content] | [Content] | [Content] |
| 2 | Application Anti Money Laundering Form | Form collecting data related to anti-money laundering compliance within an application. | Data Form | ✓ | [Content] | [Content] | [Content] | [Content] |
| 3 | Application Due Diligence Form | Form capturing thorough due diligence information during an application process. | Data Form | ✓ | [Content] | [Content] | [Content] | [Content] |
| 4 | Application Source of Funds Approval Form | Form confirming the legitimacy of funds provided in an application. | Data Form | ✓ | [Content] | [Content] | [Content] | [Content] |
| 5 | Application Identity Verification Form | Form verifying the identity of individuals during the application process. | Data Form | ✓ | [Content] | [Content] | [Content] | [Content] |
| 6 | ∨ Proof of Address Form | A proof of address form is a document used to collect evidence that verifies an individual's current residential address for various purposes such as official correspondence and account applications. | Data Form | ✓ | [Content] | [Content] | [Content] | [Content] |
| 7 | Proof of Address Form - Address Proof Upload | Documents to verify an individual's current residential address. | Data Field | ✓ | [Content] | [Content] | [Content] | [Content] |
| 8 | Proof of Address Form - State | State field to verify an individual's current residential address. | Data Field | ✓ | [Content] | [Content] | [Content] | [Content] |
| 9 | Proof of Address Form - City | City field to verify an individual's current residential address. | Data Field | ✓ | [Content] | [Content] | [Content] | [Content] |
| 10 | Proof of Address Form - Zip | Zip code to verify an individual's current residential address. | Data Field | ✓ | [Content] | [Content] | [Content] | [Content] |
| 11 | Proof of Address Form - Suite/Apt/Other | Suite/Apt/Other to verify an individual's current residential address. | Data Field | ✓ | [Content] | [Content] | [Content] | [Content] |
| 12 | Proof of Address Form - Street Address | Street address to verify an individual's current residential address. | Data Field | ✓ | [Content] | [Content] | [Content] | [Content] |

| 1.2.3-6 | Activity | 1.2.3-7 | Review | 1.2.3-8 | Activity | 1.2

1.2.3-7  ←---- Sequence ID  401
Review Headcount Adjustments ←--- Short Description 402

The Analyst reviews the headcount adjustments for the upcoming quarter. The headcount adjustments should reflect the most relevant numbers.  ←----- Smart Description 403

∨ Details

OWNER
[Owner]

TYPE  404

DURATION

PARENT (EVENT MODEL) 405
[Parent Event Model]

CHILDREN (EVENT MODELS/ACTIVITIES) 406
[List of Children Event Models/Activities]

CUSTOM FIELD 1  409

CUSTOM FIELD 2

CUSTOM FIELD 3

CUSTOM FIELD 3

∨ Catalog Elements  407

| PEOPLE | Sub-Category |
| --- | --- |
| Analyst | |

| PEOPLE | Sub-Category |
| --- | --- |
| Project Manager 2 | |

| MATERIALS | Sub-Category |
| --- | --- |
| Headcount Adjustments (Input) | |

| INSTRUCTIONS | Rules |
| --- | --- |
| Goal 2 is a stretch goal | |

\> Traits  408

\> Characteristics

\> Reactions

\> Related Work Structure

\> Change History

Fig. 4b

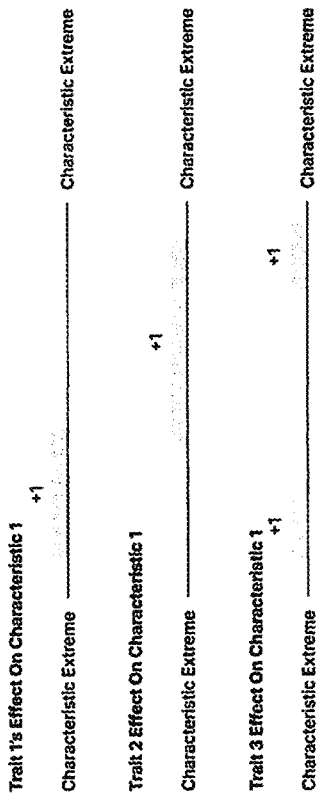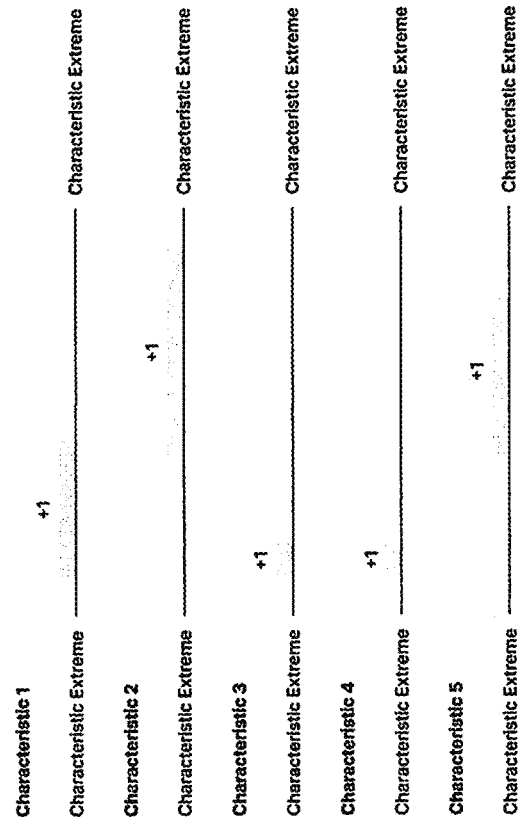

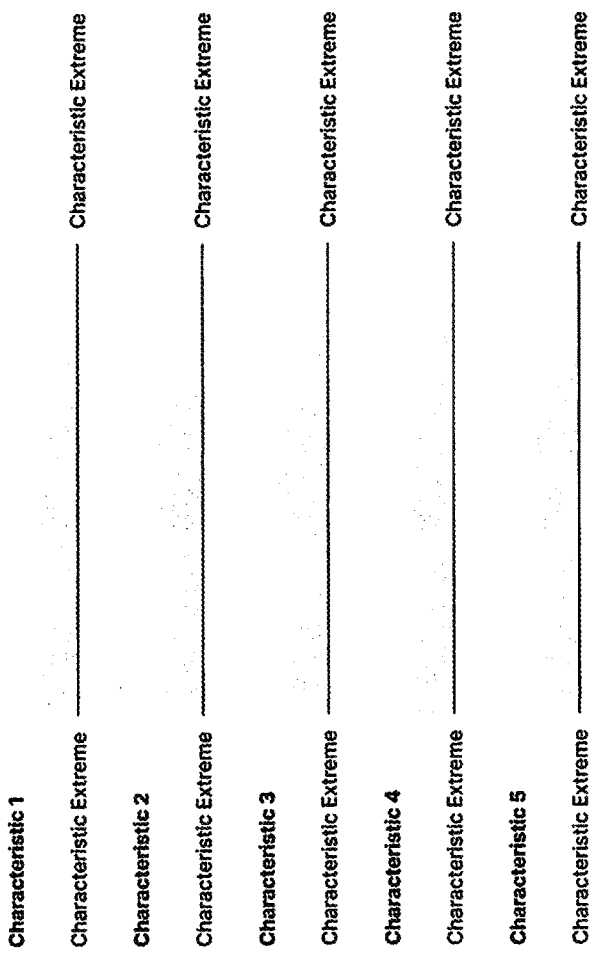

1200

The Analyst reviews the headcount adjustments for the upcoming quarter. The headcount adjustments should reflect the most relevant numbers.

1.2.3-7
Review Headcount Adjustments

1201

REACTIONS  Add a Reaction + wow  huh  eureka

CATALOG ELEMENTS  Add an Element +

- Catalog Element  1202
- Catalog Element
- Catalog Element
- Catalog Element
- Catalog Element
- Catalog Element

PROCESS FLOW DATA PARAMETERS

CROSS REFERENCES TO RELATED APPLICATIONS

This application claims priority to and is a continuation-in-part of co-pending U.S. Non-Provisional patent application Ser. No. 18/392,554 filed Dec. 21, 2023, entitled "Dynamic Process Modeling", which claims the benefit of U.S. Provisional Application No. 63/458,306 filed Apr. 10, 2023, entitled "Dynamic Work Implementation Specification", and which claims the benefit of U.S. Provisional Application No. 63/435,634 filed Dec. 28, 2022, entitled "Dynamic Work Models and Process Flows", the entire contents of which are hereby expressly incorporated herein by this reference including, without limitation, the specification, claims and abstract, as well as any figures, tables, or drawings thereof.

FIELD OF THE INVENTION

The technology relates generally to the field of process flow modeling, and more particularly to methods and systems to establish process flow parameters of dynamic, hierarchical process models that provide measurable qualitative aspects of the process.

BACKGROUND OF THE INVENTION

In conventional systems, process flows typically show static events, actors, and deadlines, which are edited by a user when elements require revision and do not reveal inconsistencies, inaccuracies, connections among process flows, and opportunities within. One example of a process flow is a work flow, although any other type of process may be considered such as a software design flow or a data transfer flow. "Processes flows" as used within this document may represent both the sequential flow of component process parts as well as the relationships among various process flows and various component parts of those flows. The layouts of conventional process flow applications are typically linear, sequential, and static. Conventional applications are not multi-dimensional, collaborative, and interconnected as presented herein. Conventional systems typically provide a view of the sequential process flow and do not provide opportunities for data-driven and dynamic features that allow individuals to capture, visualize, measure the interdependent aspects of the process flow, and provide an assessment of its quality, feasibility, and other benefits.

BRIEF DESCRIPTION OF THE DRAWINGS

FIG. 3b is an illustration of a catalog of catalog elements.

FIGS. 4a and 4b are illustrations depicting an example user interface to contextualize activities within an event.

FIGS. 6a, 6b, 6c, and 6d are illustrations of the structure of work parameters, such as characteristics, traits, and attributes in events.

DETAILED DESCRIPTION

Example System Architecture

Figure 1:
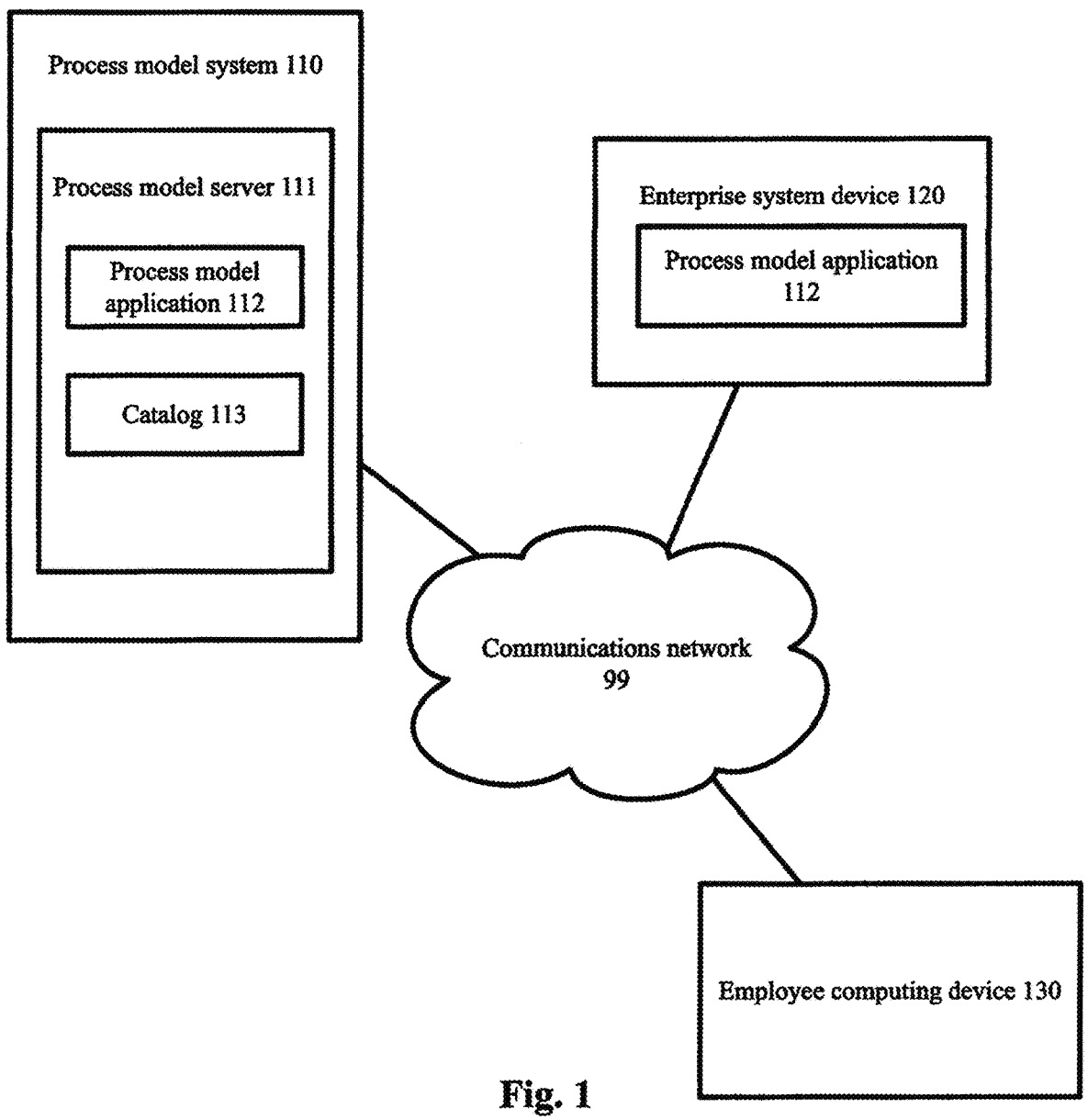
FIG. 1 is a block diagram depicting a system to capture, visualize, and measure the interdependent aspects of a process through the creation of dynamic process models and process flows.

FIG. 1 is a block diagram depicting a system to capture, visualize, and measure the interdependent aspects of a work process through the creation of dynamic process models and process flows. As depicted in FIG. 1, the architecture 100 includes a process model system 110, an enterprise system device 120, and an employee computing device 130 that are connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the process model system 110 is operated by a network operator, a network designer, or other user that may use the process model system 110 to operate a system or communicate to other devices to access services or data. The enterprise system device 120 may be operated by a user, operator, or other person or system that accesses or uses the process model application 112 to review, observe, edit, create, or assess a process model. The employee computing device 130 may be operated by a user, employee, operator, or other person or system that performs assigned tasks for the enterprise system. While each server, system, and device shown in the architecture is represented by one instance of the server, system, or device, multiple instances of each can be used.

As shown in FIG. 1, the process model system 110 includes one or more process model servers 111. The process model server 111 may be one or more devices, servers, software applications, cloud computing devices, hardware, or any other types of device, function, or module that is part of the process model system 110 as is used for performing tasks, storing data, providing services, communicating with users, communicating with third-party devices, or performing any other suitable actions. The process model server 111 may have an application, module, or other function that operates as a process model application 112. The process model application 112 may be the application that performs the methods described herein to create, host, edit, analyze, monitor, or otherwise service the process model. The process model application 112 may be accessed or edited by an enterprise system device 120. The process model application 112 may monitor activities of an employee computing device 130. The process model application 112 may utilize a catalog 113. The catalog 113 may represent any database or other compilation of data that may be used to populate a process model, such as a database of persons, equipment and other enterprise assets, data, materials, instructions, attributes, features, or other aspects of an event or feature.

The enterprise system device 120 may represent a computing device that is used by an enterprise operator to construct, edit, monitor, analyze, or otherwise use a process model. The enterprise system device 120 may utilize the process model application 112 to perform any of these suitable tasks. The process model application 112 may be a version or replication of the process model application 112 that is hosted or operated on the process model server 111. That is, a user may access the hosted process model on the process model application 112 to engage with the created process model from the process model server 111. The enterprise system device 120 may be any type of device, such as a laptop, smartphone, workstation, server, or other device as described herein.

The employee computing device 130 may represent a computing device that is used by an employee or other user to perform assigned tasks of the enterprise. For example, the employee computing device 130 may be a laptop assigned to an employee or contractor to perform tasks such as accounting tasks, programming tasks, human resource tasks, research tasks, or other tasks that achieve assigned goals of the enterprise.

Figure 13:
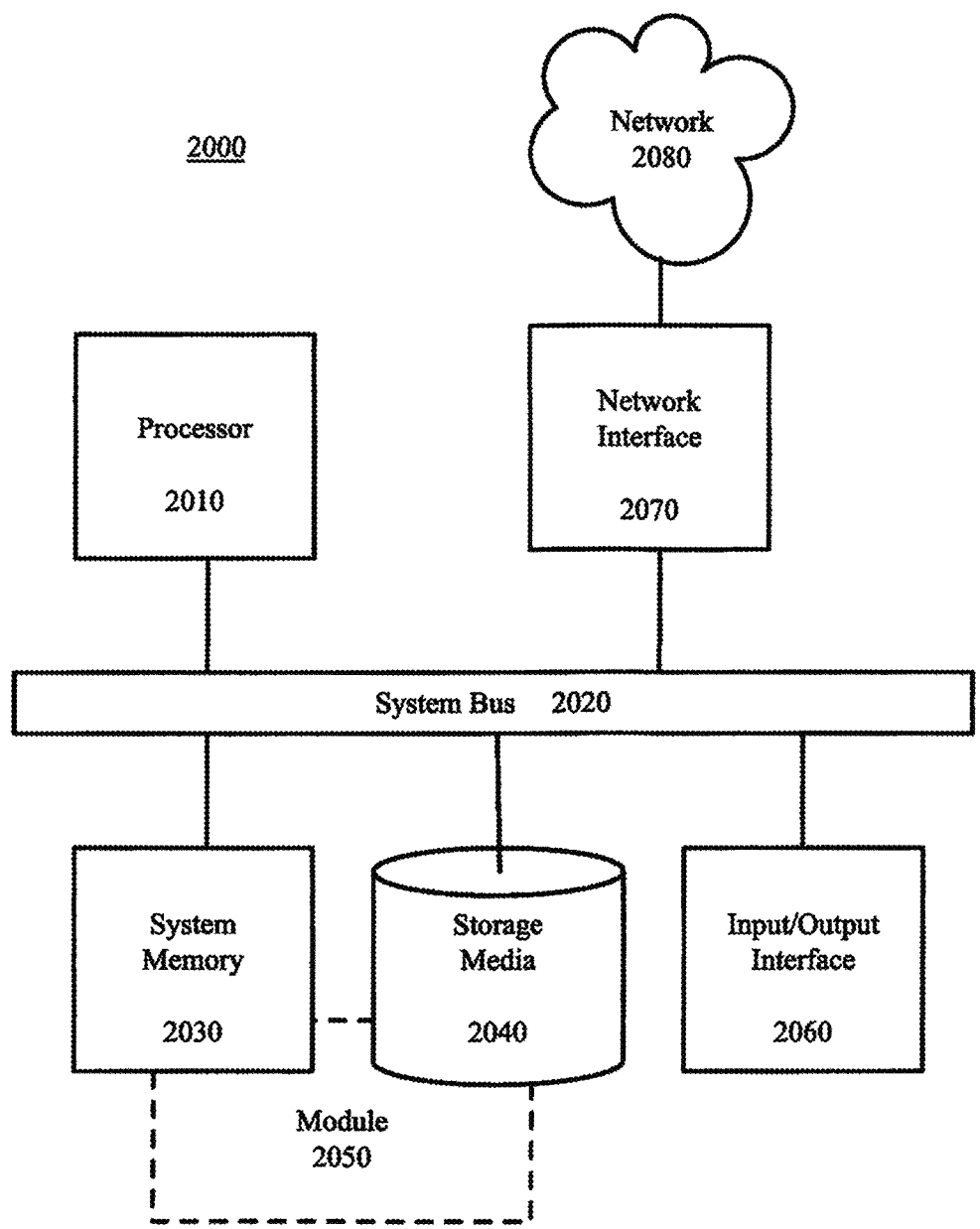
FIG. 13 depicts a computing machine and a module.

In example embodiments, the network computing devices and any other computing machines associated with the technology presented herein may be any type of computing machine such as, but not limited to, those discussed in more detail with respect to FIG. 13. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 13. The computing machines discussed herein may communicate with one another, as well as with other computing machines or communication systems over one or more networks, such as network 99. The network 99 may include any type of data or communications network, including any of the network technology discussed with respect to FIG. 13.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology for embodiments of the invention may employ methods and systems to translate dynamic, hierarchical process models and process flows to a work implementation specification to provide users with user stories, functional requirements, and other documentation that illustrates the process.

The examples for embodiments of the invention may employ computer hardware and software, including, without limitation, one or more processors coupled to memory and non-transitory computer-readable storage media with one or more executable computer application programs stored thereon, which instruct the processors to perform such methods.

The example methods illustrated in FIGS. 2-9 are described hereinafter with respect to the components of the example communications and processing architecture 100.

Figure 2A:
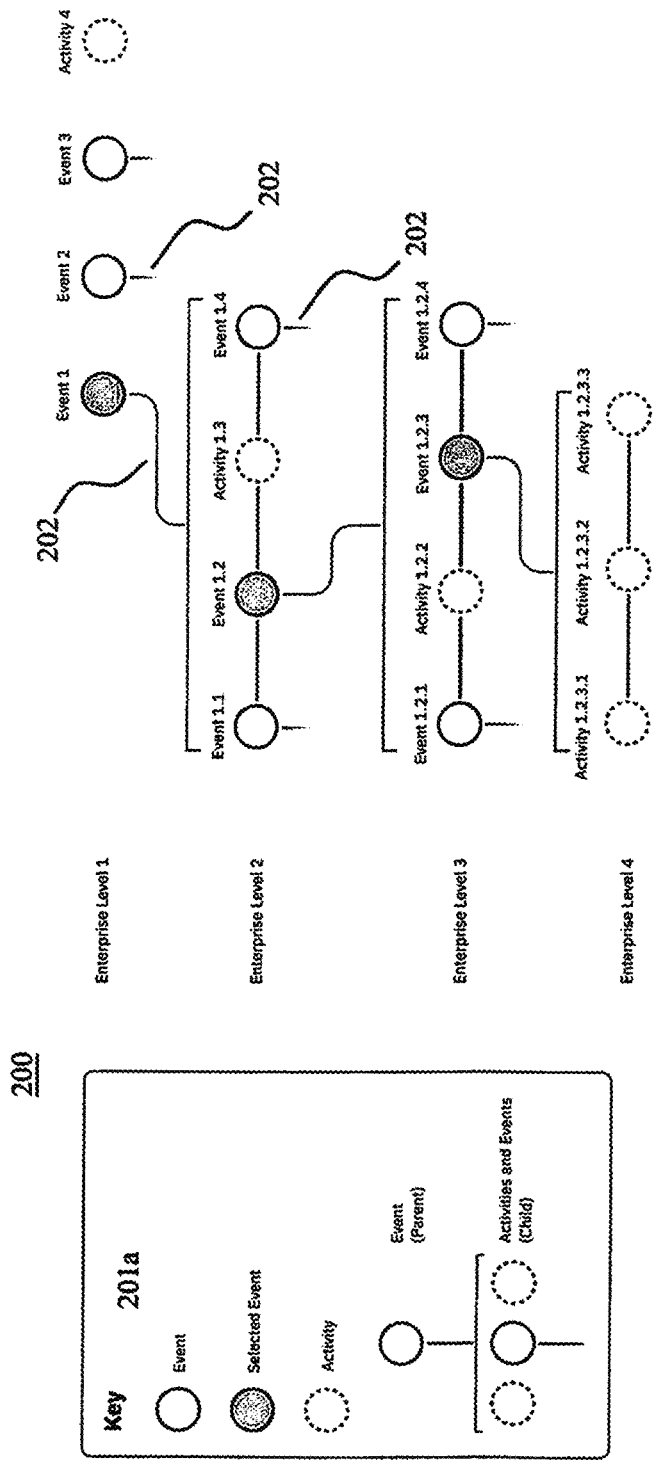
FIG. 2a is an illustration depicting an example hierarchical enterprise structure of a process model application.

FIG. 2a is an illustration depicting an example user interface displaying a hierarchical enterprise structure 200 of a process model application 112. The structure 200 represents various levels of summary data driven by granular data from the various levels of an enterprise.

In the example, events within the process model application 112 are organized into enterprise hierarchy structures, such as structure 200. Each structure is designed to house the events specific to an organization or part of that organization. Certain organizations may not have multiple enterprises. Each enterprise is an organizational structure designed to contain the information needed to document a single organization's operations. The enterprise hierarchy is an organizational structure based on hierarchical relationships among Functions, Events, and Activities within an organization. Example functions, events, and activities will be described herein.

Within an enterprise, users can create and view different events, each made up of activities or other events that have either sequential or non-sequential relationships. In addition, any of those events can be nested within another event at the next highest level of the hierarchy of the structure 200 in a hierarchical relationship. In certain examples, events and activities may be connected in a sequential or a concurrent sequence. In other examples, the events and activities may be related to one another but not part of a sequence.

In the examples, an activity is an object within the system that holds data describing a discrete action that may occur within an enterprise operation, such as performing a task, obtaining a material, sorting data, or other suitable activities. An activity may consist of information such as the owner, budget, duration, and sequence ID of the activity. Examples of an activity may include transferring data, copying a database, making headcount adjustments, or taking out the trash.

In the examples, an event is an object within the system that holds multiple activities and additional information about the relationships among the activities that it contains. An event consists of information such as: 1) a sequential relationship among activities (sequence lines); 2) the logic that defines which set of activities are performed in different circumstances (sequence lines>decision logic); 3) data related to any functions tagged to that event (functions), a flow of data/material catalog elements among activities (data and material elements, material and data flow); and 4) summary information about the activities contained within the event, such as an example total duration (aggregation & dissemination). Examples of an event may include creating a mobile application, submitting a data request, or completing an anti-money laundering check.

An event may contain multiple events or activities in a sequential order. An example of a process, procedure, method or other series of activities that may be expressed by an event is the process of creating a performance forecast. The example event may be structured as a first activity or event to consolidate the data used to create the forecast, a second activity or event to run the analysis, a third activity or event to review the forecast, and a fourth activity or event to submit the forecast. The sequence of activities or events forms an event. The activities are each a component part of events that describe a discrete step within a process.

Further, a single event that is a child of another event may represent nested events at a lower level of the hierarchical enterprise structure 200. That is, the event is itself an event that is made up of a series of activities or events. In the example, the first activity was to consolidate the data used to create the forecast. This activity may be an event that includes a first activity of obtaining data from a database, a second activity of extracting data related to the forecast, and an event of populating a spreadsheet with the data.

If an event has nested events or activities, some attributes of the parent event may be driven by the children events or activities or may be set by a user, a process designer, a software application, or other party. In the example, the event for creating a performance forecast will include parameters related to an activity of the sub-event, such as parameters related to the database and the spreadsheet.

In another example, an event is created that represents the process of generating and reviewing a report. Within that event, there are five different activities or events, with one of the events being directed to exporting the report. The event of exporting the report would then serve as an event to activities or events at the next lower level of the hierarchy that together make up the event of exporting the report. That event could then have its own set of children activities or events.

The utility of the relationship of parent events to children of the parent event may be similar, whether the children are activities or events. As used throughout, certain tasks that may be associated with activities or events may be described in examples using only one of events or activities. However, certain tasks described herein may apply to either events or activities. That is, a child of a parent event may be described as an activity, but the child may alternatively be an event in other examples if that child serves as a parent for other children. Further, an activity may become an event at a later time if activities are added to as children at a lower level.

The example hierarchical enterprise structure 200 of a process model application 112 depicts an example of a process with four enterprise levels. At Enterprise Level 1 there are events and one activity, Event 1, Event 2, Event 3, and Activity 4. All of these events and activities comprise the complete operation of enterprise level 1. As depicted, Event 1 is also an event with children that appear in enterprise level 2.

Each event is indicated with a vertical line beneath the event icon. Two of the event lines are illustrated as event lines 202. The Activity 4 is illustrated with a dashed icon and without an event line. The event line 202 indicates that further events are activities are children of the event. As activities do not have children events or activities, Activity 4 does not have an event line.

Event 1 is indicated as highlighted as a selected event. In the example, a user may have clicked or otherwise selected Event 1. When selected, the hierarchical structure under Event 1 is expanded and displayed. The unselected events, such as Event 2 and Event 3 are illustrated with the event line 202 ending, disappearing, or fading.

Event 1 has four events that must occur for Event 1 to be completed. The three children events of Event 1 are Event 1.1, Event 1.2, and Event 1.4. The events at this enterprise level are illustrated with event lines, such as event line 202 under Event 1.4. One activity is illustrated as a child of Event 1, Activity 1.3. Activity 1.3 does not have an event line 202 since the activity does not have any children in a lower hierarchical level.

Further, as depicted Event 1.2 is illustrated as being selected. The lower hierarchical levels of Event 1.2 are thus displayed in Enterprise Level 3 with three children events and one activity. Event 1.2.3 is an event with three children activities in enterprise level 4. Because the activities in Enterprise Level 4 do not have any further children events or activities, Enterprise Level 4 is the lowest level for the hierarchical structure of Event 1.

The four Enterprise Levels 1, 2, 3, and 4 represent a hierarchy of events and activities. Enterprise Level 1 may be considered a parent level, Enterprise Level 2 may be considered a child level, Enterprise Level 3 may be considered a grandchild level, and Enterprise Level 4 may be considered a great-grandchild level.

The illustration of FIG. 2a includes a Key 201a that depicts the elements of the illustration with a description of the element. The Key 201a illustrates an event, a selected event, an activity, and a parent child arrangement.

As described in the Key 201a, an event that is depicted with a darker fill is a selected event. For example, if a user has clicked on an element, such as an event or a function, the element is shown with a dark fill inside the icon circle. Each child and grandchild event or activity that makes up the selected element is displayed. While FIG. 2 depicts the selected event with a dark fill, any other suitable depiction may be utilized, such as a change in color, a change in brightness, a change in shape, or any other suitable depiction that serves to highlight the selected element.

When selected, details about that element may be displayed, such as in a popup window, in a split screen window, or in any other type of display. The details may be any suitable detail about the element such as catalog elements, as described herein. For example, when Event 1 is selected, events and sub-activities of one or more children and grandchildren may be highlighted or displayed.

As users, a machine learning function of the process model application 112, or another device or system build the hierarchical structure, the process model application 112 will aggregate and disseminate information related to the events and functions. For instance, if a user has built three events that are each comprised of ten activities and the user wishes to create an event that encompasses those three events at a higher level, the process model application 112 will aggregate the information from the three activities into a higher enterprise level event comprised of the three events. The process model application 112 will populate the structure 200 with the three events. Each of the three events will have the structure 200 populated with the ten events in a lower enterprise level for each of the three events. The process model application 112 will have a knowledge and a summary of every event, activity, or function that is required to complete the parent enterprise level.

For example, if a user has determined that Events 1.1, 1.2, 1.4 and activity 1.3 together perform a task that the user would like to capture in an event. The process model application 112 will aggregate the information from the three events and the activity into a higher Enterprise Level 1 and populate new Event 1 with the hierarchical structure. The hierarchical structure may be displayed on the hierarchical enterprise structure 200, such as on a user interface function of the process model server 111.

The system may employ other examples of aggregation and dissemination of information related to the events and functions. For example, attributes such as catalog elements may be aggregated from all children events to a parent event. These may be aggregated in the form of individual catalog elements but may be summarized using a higher-level catalog element. For example, if many individuals on the same team are aggregated up to a parent, the system may suggest that the team be cited in the parent event. Additionally, any quantitative attributes such as duration may be summarized at the parent level as the sum of the durations of the children events.

Certain catalog elements may disseminate from parent events to children events. For example, if a rule is applied to a parent, the children events must also follow that rule. Additionally, quantitative attributes may be disseminated from a parent to children as a total limit. For example, if the parent event must take place in a certain duration, the sum of the durations of the children events may not exceed that total duration value. If the design is in violation of the information disseminated from the parent, an alert/notification/smart signal will be presented to the user.

One or more of the events within the system may have variants. Variants are duplicates of the original event that may be modified to test out varying event compositions. For example, one event may represent the process of converting a data set. A user may create variants of the original event to articulate what that process may look like utilizing different tools and methods. One variant may be identified as the root variant, which will be the event that is referenced within the enterprise hierarchy. As events dictate, other variants may be swapped in to replace the root variant. For example, if inputs to the data set change, and a different type of data conversion technology works more efficiently, then a variant event that uses the different technology is inserted into the hierarchical structure to replace the root variant.

In examples, variants will inherit information in the same way as the root variant (aggregation and dissemination). However, in certain examples, only the root variant will have its attributes disseminate to the children.

The process model application 112 may store an alternate hierarchical enterprise structure 200 with variant events along with the primary hierarchical enterprise structure 200. A user may explore how the alternate hierarchical enterprise structure 200 and the primary hierarchical enterprise structure 200 are affected by changing conditions or by changing inputs. The process model application 112 may perform simulations on each of the hierarchical enterprise structures 200 to determine how the variant affect the system. When a variant event is determined to be the preferred event, the variant event may be substituted as the primary event in the hierarchical enterprise structure 200.

Figure 2B:
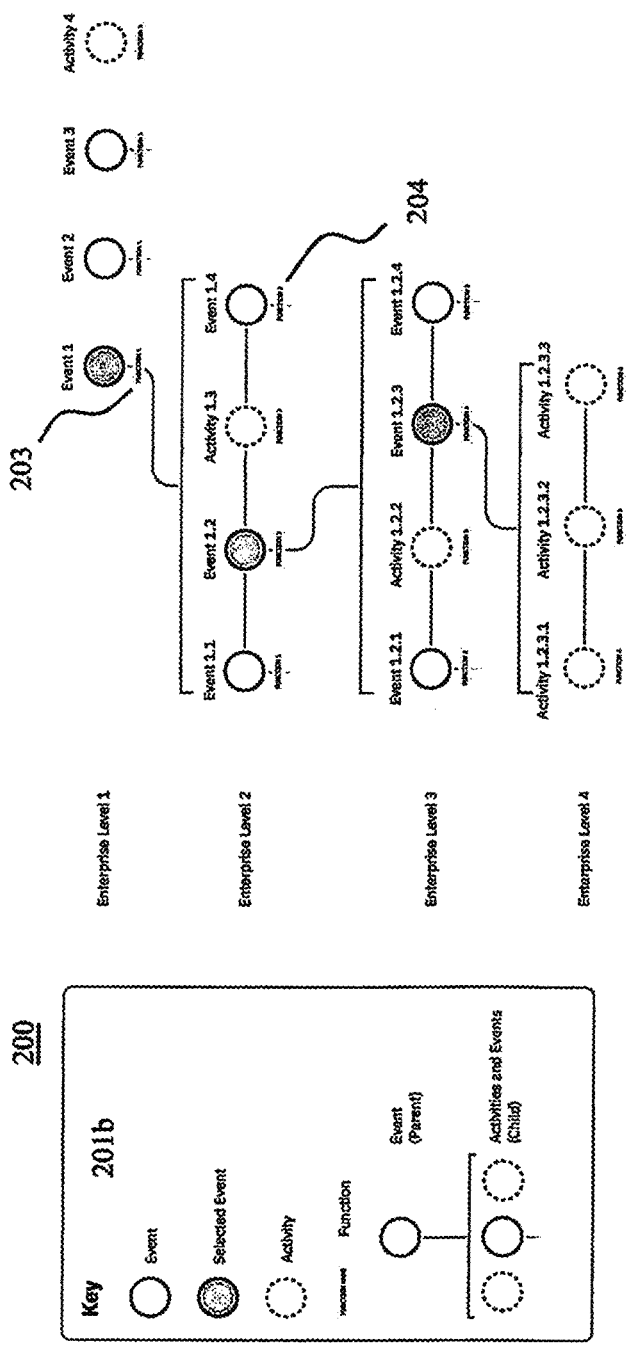
FIG. 2b is an illustration depicting an example hierarchical enterprise structure of a process model application with functions tagged to events and activities

FIG. 2b is an illustration depicting an example hierarchical enterprise structure 200 of a process model application 112 with functions tagged to events and activities.

A function is a user-defined categorization of events within the enterprise to allow grouping of portions of the enterprise by common features. A function may contain a hierarchical list of tags that may be applied to events. For example, if a user were to create a function type representing geographical location, the function name may be defined as "Geographical Location." The function may have tags that include: North America, United States, Mexico, Canada, South America, Brazil, Europe, United Kingdom, Asia, China, Japan, Africa, Ghana, or South Africa.

Another example function type may be labeled as "Functional Area." Elements with these functions may have tags that include Research & Development, Database Management, Medical Devices, Human Resources, Planning, or Accounting.

Another example function type may be labeled as "Product Type." Elements with these functions may have tags that include Configuration Software, Data Processing, Machine Parts, Straight to Consumer, Food, Cosmetics, or Personal Care.

If a function is tagged to a parent event, unless otherwise specified, children events will be categorized under the same function. If a function is applied to a parent event, it will not limit the functions that are applied to its children. For example, a user or a software process may model a process at the parent level and specify its function as "Geographic Location: North America." The user then may specify the function of a child event to be "Geographic Location: China." In this example, the function would represent an event in which the work is done both in North America and China with the parent event being owned by a North American unit of the enterprise and the child event being owned by a Chinese unit of the enterprise.

In certain examples, only one function for a certain type of function that is defined may be applied to each event. For example, only one type of location function may be applied to an event, but other types of functions may be applied to the event. For example, an individual may choose to apply "Geographical Location: China" and "Cost Center: ASPAC" to an event to note that the work represented by the event takes place in the geographical location of China and the associated costs are reported under the cost center ASPAC. In other examples, two or more functions of a certain type may be applied to an event. For example, an event may create two product types as outputs. The functions applied may include "Product Type: machine part" and "Product Type: recycle material."

Once events have functions applied to them, a user may filter the enterprise by those functions to isolate models that represent specific portions of the enterprise. The user may perform a search or a sort function on events in an enterprise to identify, group, or sort the events and activities based on the functions applied. For example, a user may query the enterprise by "Geographic Location: North America" to return all of the events with the "Geographic Location: North America" function. The system may additionally return all of the events that have tags under "Geographical Location: North America" such as events with the functions "Geographic Location: United States," "Geographic Location: Mexico," "Geographic Location: Canada."

In the illustration of FIG. 2b, the events and activities are illustrated with functions, such as function 203. Each function is associated with an event or an activity in any suitable way. For example, a user may click an option to add a tag to an event. A function may accrue to an event because a parent or a child event is associated with that function. A function may be assigned to all events or activities in a group, or performed in a certain region, or performed by a certain set of operators, or in any other way are grouped into a category that may be assigned with a feature.

Event 1 and Event 1.4 are illustrated with a function 203. The function 203 is labeled as Function 1. The Function 1 may be any suitable function, such as "Geographic Location Mexico" or "Product Type: Mobile Application." The function 203 is illustrated as a tag placed under the Event 1, but any other suitable representation of the function 203 may be used. In certain examples, multiple functions 203 may be displayed such as Function 1, Function 2, and Function 3. Activity 4 is also illustrated with a Function 2.

In addition to the features of key 201a, the key 201b includes an image of a Function tag with the label of Function.

Figure 3A:
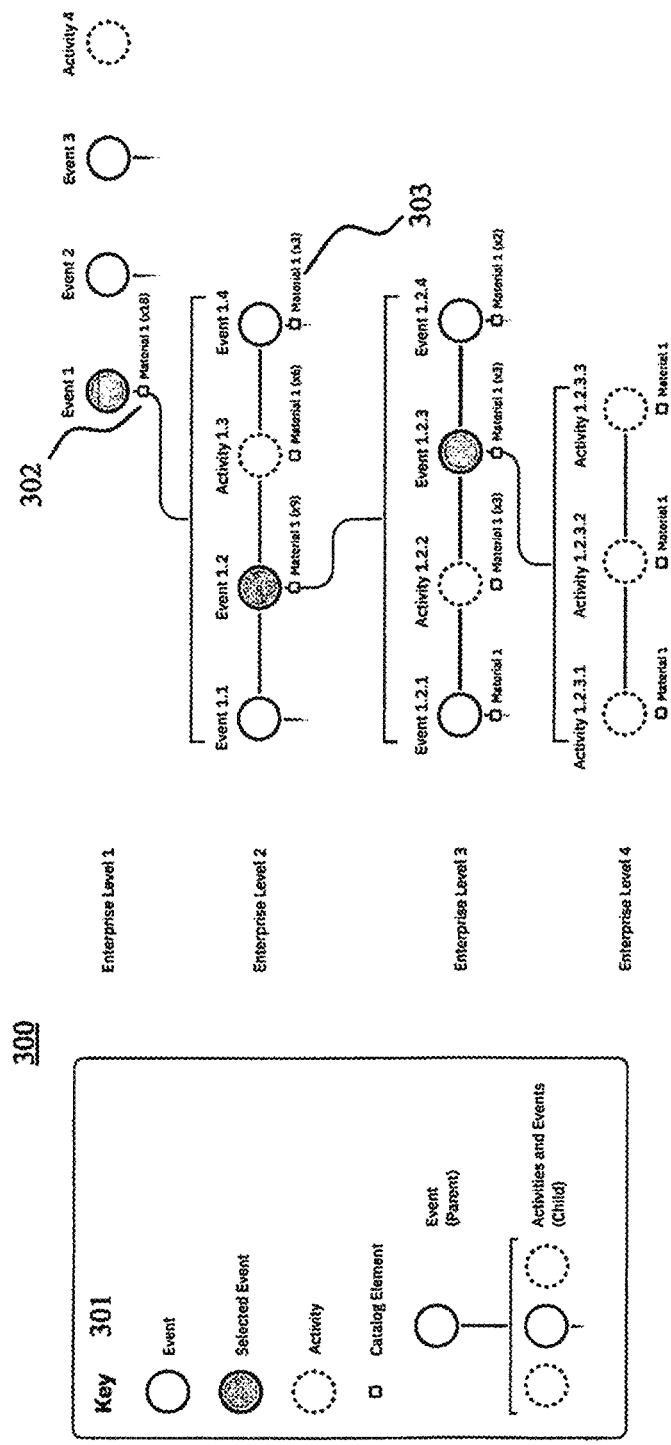
FIG. 3a is an illustration depicting an example hierarchical enterprise structure of a process model application with traceable catalog elements.

A function type of "Functional Area" may have tags that include:
Research and Development
  Consumer Products
  Pharmaceuticals
  Medical Devices
Human Resources
  Payroll
  Benefits
  Recruiting
Finance
  Planning
  Purchasing
  Accounting FIG. 3a is an illustration depicting an example hierarchical enterprise structure 300 of a process model application 112 with traceable catalog elements. The process model application 112 provides a catalog 113 that houses individual elements that facilitate and support the processes performed in an event, activity, or a function.

A catalog element is an object within the system that represents a resource that allows the process event or activity to be performed. A catalog element may represent a dataset, a database, a data element, role, a team, an individual, a place, tool, material, a rule/regulation, goal/objective, or any other suitable elements. The attributes of a catalog element may contain any information relevant to its application within an activity and these attributes may differ depending on what the catalog element represents.

For example, an individual catalog element directed to an individual performing a task may include information on how much the individual is paid or what skills the individual possesses. For example, the catalog element may include: {Name: John Doe, Salary: $80,000, Skills [Microsoft Office, data analytics, leadership]}. Alternatively, a catalog element directed to a rule may contain the definition of a regulation that must be followed: {Name: [Maximum Application Processing Time], Definition: [[activity duration]<24 Hours]}. The data that populates the various catalog elements may be entered manually within the tool or imported from other enterprise systems such as Workday or SAP.

In FIG. 3a, the hierarchical enterprise structure 300 is illustrated with a similar structure as hierarchical enterprise structures 200a and 200b. Hierarchical enterprise structure 300 includes catalog elements tagged to the events and activities.

Event 1 is illustrated with catalog element 302. Catalog element 302 is illustrated as Material 1 (×18). This catalog element 302 indicates that 18 units of a material logged as Material 1 is required to perform Event 1. For example, an Event 1 that creates a solution of a chemical requires 18 liters of a raw material chemical to produce the solution. Event 1.4 is illustrated with catalog element 303 that reads Material 1 (×3). The Event 1.4 requires 3 units of the Material 1 to complete.

Any suitable catalog element may be displayed on the hierarchical enterprise structure 300. In certain examples, multiple catalog elements may be displayed.

The illustration of FIG. 3a includes a Key 301 that depicts the elements of the illustration with a description of the element. The Key 301 illustrates an event, an activity, a selected event, a catalog element, and a parent child arrangement.

Once events have catalog elements applied to them, a user may filter the enterprise by those catalog elements to isolate models that have similar catalog elements, such as multiple processes that use a common raw material. The user may perform a search or a sort function on events in an enterprise to identify, group, or sort the events and activities based on the catalog elements applied. For example, a user may query the enterprise by "operations worker" to return all of the events that require operations workers to perform.

Each catalog element is associated with an event or an activity in any suitable way. For example, a user may click an option to add a tag to an event. A catalog element may accrue to an event because a parent or a child event is associated with that catalog element. A catalog element may be assigned to all events or activities in a group, or performed in a certain region, or performed by a certain set of operators, or in any other way are grouped into a category that may be assigned with a feature.

FIG. 3b is an illustration of a catalog 113 of catalog elements 302. A user interface displays the catalog 113 of the catalog elements 302 to allow a user to select a catalog element 302 to apply to an event or an activity.

In an example, the catalog 113 is displayed when a user selects an option or an interface object on a hierarchical enterprise structure 300 to add catalog elements to an event or an activity or to review the repository of catalog elements associated with an enterprise. The process model application 112 directs the user interface to display the catalog 113.

The catalog 113 is a repository of various catalog elements that are stored within the system. Depending on the nature of the catalog elements, they may be stored in flat or hierarchical structures. In an example, one hierarchical structure may represent a group or a team that may be composed of smaller teams and/or roles. Alternatively, roles or individuals may be captured in a flat list as they may not be broken into smaller components. Places may also be described in a hierarchy to depict location with varying degrees of specificity. For example, a parent catalog element 302 may represent an office building, the children may represent floors, and the grandchildren may represent conference rooms or offices.

The catalog 113 may be stored in the process model application 112, on a third-party device, on the process model server 111, or in any suitable location that is logically or communicatively linked to the process model application 112.

Catalog elements 302 may be applied to activities or events to note that a particular person or tool is needed to complete that activity. For example, an individual may define an activity as "Analyst Processes New Client Application Form." Within this activity, the catalog elements may be applied that represent the "Analyst" and the "New Client Application Form." When applied to the activity, data contained within the catalog element object may influence the attributes of the activity.

For example, within the definition of the "Analyst" one might define the average salary for that role. When applied to the activity, the system will utilize its duration attribute as well as the salary attribute of the "Analyst" catalog element to calculate the cost of an individual of that role doing an activity to the business. Additionally, any application of a catalog element may be also reflected on the catalog element object itself. In the previous example, the "Analyst" catalog element may contain information describing its application within that activity as well as any other activities it may be applied to. Any changes made to the catalog element object may have an effect on the activities to which it is applied.

The catalog 113 is displayed with a first column representing a NAME of the catalog element, such as Application Risk Form or Application and Money Laundering Form. These are catalog elements 302 that may be selected to apply to an activity or event. The catalog elements 302 may be selected by being clicked, dragged, or otherwise denoted as being selected.

The second column is the DESCRIPTION of the catalog elements 302. This column includes a quick overview describing the catalog element 302 and the purpose of the catalog element 302. Additional columns allow further descriptions or designations for the catalog elements 302. Each column may have a pull-down menu or other interface for entering specifics about the catalog element 302. For example, for a catalog element 302 of Database Entry Form, the catalog element 302 may allow entry of an OWNER, a SIZE of the data entry allowed, a TYPE of database, or any other features of the Database Entry Form.

When a user selects a catalog element 302 and enters or selects options for the further descriptions or designations, the catalog element 302 is associated with the event or activity. The catalog element 302 may be displayed on the hierarchical enterprise structure 300 affixed to or near the event or activity with which the catalog element 302 is associated.

Like a data dictionary, the catalog 113 defines the people, places, data, materials, tools, objectives, rules, and other resources that an enterprise has available, has implemented, plans to have available, or plans to implement. Attributes specific to the category of the catalog 113, such as a category of persons or places, are associated with each element to add context to that element. These attributes represent static and stable characteristics and properties of the persons, places, objects, and objectives established in the catalog 113.

Catalog elements 302 are customizable structures that contain information related to a specific item that facilitates the work that is modeled in the process model application 112. Each catalog element 302 can be referenced within an event when selected by a user or designated to populate within an event automatically. When a catalog element 302 is referenced within an event, an application of that catalog element is created allowing data to be collected specific to a catalog element in the context of an event. A catalog element application is created automatically when a catalog element 302 is referenced within an event. A catalog element application can be used to collect additional data related to that catalog element's deployment within an event. Data collected from catalog element applications is stored under the catalog element.

Catalog elements 302 may be associated with one or more categories. The categories for each catalog element may be stored in a database or other memory. The categories may be designated by a user for each catalog element or otherwise associated. The categories may be related to any feature, parameter, user, system, or other type of category that is associated with the catalog elements.

For example, one category of catalog elements 302 may be related to a human-centric perspective of work activities. This category of People may describe the type of person that is associated with an event or function. For example, a certain activity may typically be performed by a contractor instead of an employee, and thus the contractor would be a subcategory of the human catalog elements. In another example, a certain event may typically be performed by an employee that has received a required level of training, and thus the category of human would be associated with the required level.

In another example, a category of Teams may be associated with groups of multiple roles that may work together within an event. Teams may be nested within each other. For example, HR might be a department that has nested departments that contain people that specialize in specific aspects of HR such as payroll, training, onboarding, interviewing, and other HR functions.

In another example, a category of Roles represents the functions assumed by a specific individual within an enterprise. For example, a Senior Data Analyst may be a role associated with an employee that performs a particular set of tasks or functions for the organization. The capabilities, expectations, costs, and other attributes of a Senior Data Analyst may be associated with the category.

In another example, a category of Individuals represents individuals within an enterprise. An individual will have at least one role within the company. The role may be based on any suitable definition. For example, one organization may identify contractors as employees while another organization may not. Employee visibility may be controlled by administrators or HR to protect personal information of employees.

In another example, a category of Places represents the settings in which activities take place. Places may be of the digital or physical type. Places may be nested within each other to describe a location with varying degrees of specificity. For example, a place might represent a factory, a nested place might be a specific floor within that factory, or the place may represent a digital meeting.

In another example, a category of Tools represents tools that are utilized within an event. Tools may be of the digital or physical type. Examples of tools may include certain software applications, certain computing devices, an injection molding machine, a moving van, or a forklift.

In another example, a category of Data may represent individual data points, or data sets that can be transferred between activities and modified within an event. For example, a data catalog element may be first quarter expenses, yearly sales totals, new subscriptions from a campaign, responses to a questionnaire, or any other type of data.

In another example, a category of Materials represents physical materials that may be utilized, combined, or destroyed within an event. Assemblies and Waste may be two subcategories of materials intended to capture those materials that are produced as the result of an activity within an event. In an example, raw materials used to create a polymer may be tagged as materials for an event of manufacturing a plastic part. In another example, welding gasses are consumed in the making of a part. The welding gasses may be a material even though they do not become a part of the product.

In another example, a category of Assemblies represents multiple materials that are joined together to form a new catalog element. The data structure for an assembly may include references to its component parts. For example, if an organization were to manufacture bicycles, the bicycle could be expressed as an assembly of gears, chains, tires, steel, paint, and other components. The assembly category would associate each of the components into a category element. Each of the components may further be a category element.

In another example, a category of Waste represents materials that may be lost within an activity. For example, if an event represents the cutting of a 5' piece of material into two 2' segments, each processed material will produce approximately 1' of waste material during the activities of the event.

In another example, a category of Objectives represents a category of the catalog meant to contain content that is intended to guide the design of work within the tool. For example, an event of assembling a mechanical device that changes frequently may require a set of objectives for each event instance. The event will have a category instance of Objectives created for each event.

In another example, a category of Rules represents specific regulations developed by an enterprise or entity to govern the enterprises actions, such as policies, regulations, and service level agreements. When an instance of a rule is applied to an activity, the rule may limit other catalog elements that can be referenced or the maximum amount of time that an activity must take place within.

In another example, a category of Principles represents an organization's statements that describe what is important to the organization as well as what the organization desires to achieve. The principles may include vision statements, mission statements, purpose statements, values, and goals.

For each event, Metrics are the quantifiable measures used to track and assess the status of an activity, such as a key performance indicator. A catalog exists at the enterprise level, enabling all the events within an enterprise hierarchical structure to make use of the catalog's centralized source of information.

Within a catalog 113, the relationship an element of the catalog 113 has with other catalog elements 302 is captured formulaically in parent-child relationships (child data comprises parent data) and tags. Information is then aggregated and disseminated based on numerous parent-child relationships and tags.

Other relationships among catalog elements may be established using additional customizable fields within the attributes of a catalog element. For example, reporting structure may be captured by adding a "Reports to" field within the individual or role catalog elements and filling that field with a reference to another catalog element. An example catalog element data structure with an additional relationship may look like the following example: {Name: [John Doe], Reports to: [Darlene Johnson]}

As described with respect to FIG. 2 herein, when an event is created as a subitem within a larger event, the process model application 112 will determine that it is a child event. The process model application 112 generates and provides a reference to related details upon the creation of this parent-child relationship. In addition, when a catalog element is attributed to an activity, that catalog element will store a reference to the application of itself (location in the hierarchy and additional data points relevant to that application) and the catalog element's attributes are automatically provided as a reference. The catalog element that is tagged will then have a reference to the events in which it has been tagged, which will be employed for build and analysis purposes. When the same activity is added to a different event, the catalog elements tagged to the activity may also be added to the new event.

As illustrated in FIG. 3a, each higher enterprise level includes all of the catalog elements of the lower enterprise levels for every child event. While the example only included a single catalog element, any number of catalog elements may be used. For example, Event 1 in hierarchical enterprise structure 300 required 18 units of Material 1, but may also have required a trained technician for Event 1.2.3, a location of Dye Room for every Event in the structure, a Dye Injector for Events 1.2.1 and 1.3, and Dye Injector Instructions for Event 1.2.1. All of the tagged catalog elements associated with any child event will also be tagged in the parent event of that child event. The top enterprise level will have tagged every catalog item that is required to achieve the goal of Event 1.

When a manager reviews the hierarchical enterprise structure 300, the manager will be able to observe every part, material, personnel, instruction, rule, location, technology, or other catalog item that is required to perform a desired event.

When catalog elements are rolled up from children activities to parent activities, the hierarchical structure of the catalog may be used to simplify the list of included catalog elements in the parent activity. For example, "Team A" in the catalog may be defined as including "Role A", "Role B", and "Role C". If all three roles are tagged to children of a parent activity, the parent activity may be described as served by a "Team A."

Figure 3C:
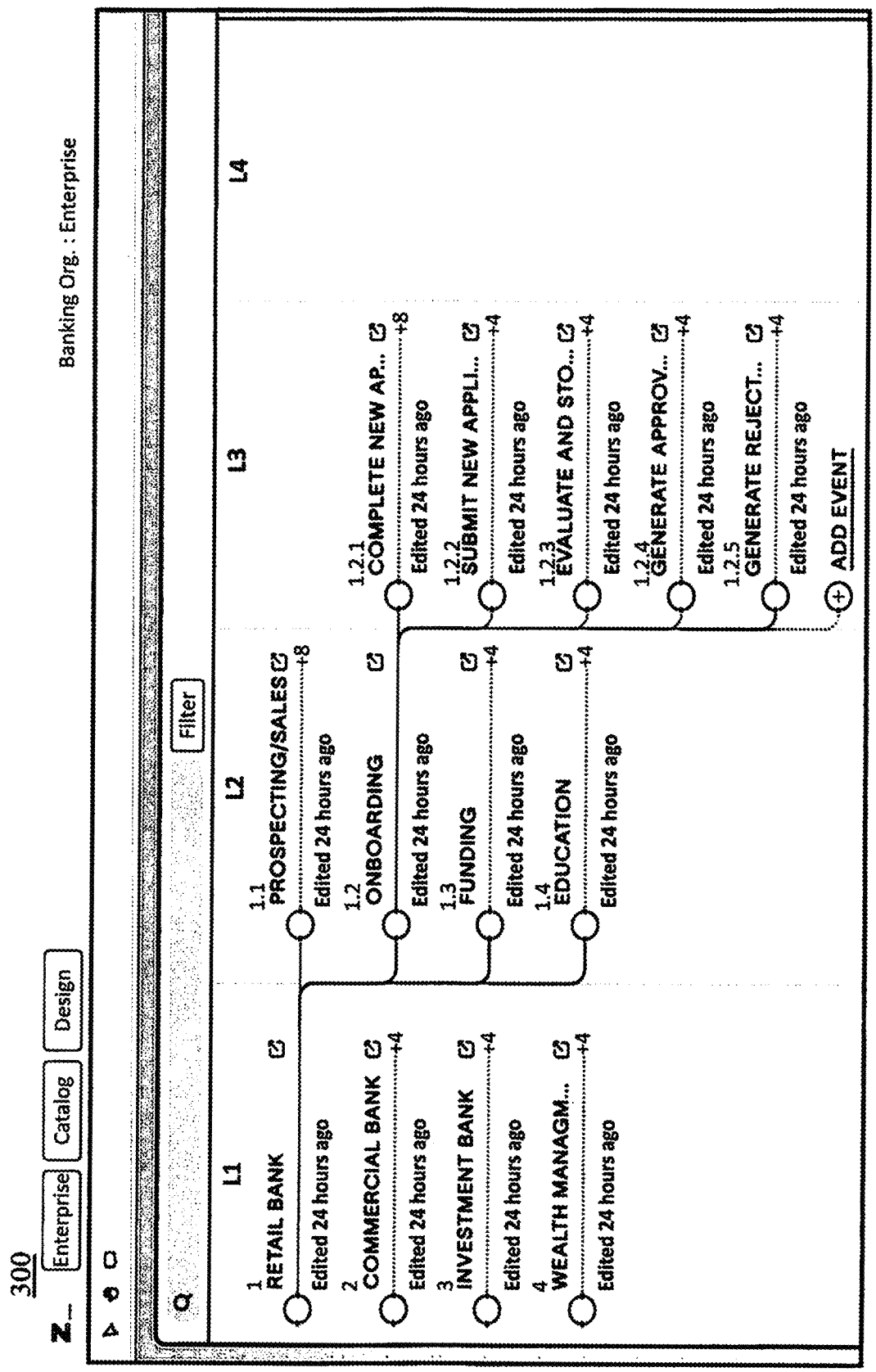
FIG. 3c is an illustration of a hierarchical enterprise structure with a horizontal parent-child relationship.

FIG. 3c is an illustration of a hierarchical enterprise structure 300 with a horizontal parent-child relationship.

In the hierarchical enterprise structure 300, a parent event is displayed in column L1 as RETAIL BANK 1. Other parent events on column L1 include COMMERCIAL BANK 2, AND INVESTMENT BANK 3. Each of these are displayed as events with a dotted line under the name of the event and a number of children, such as +4. The +4 or other designation after the event indicates that this number of events are children of the parent event. In an example, if an entry in L1 were an activity instead of an event, then the dotted line and the +4 would not be displayed because the activity would not have any children events or activities.

In the hierarchical enterprise structure 300, the RETAIL BANK 1 is displayed as being highlighted or selected. For example, a user has clicked on the icon for the RETAIL BANK 1. When selected the RETAIL BANK 1 is illustrated as being in a bolder font, a different color, not grayed out, or in any other way illustrated as being highlighted. When selected, the children of the RETAIL BANK 1 are illustrated.

In the example, the 4 events in L2 are the children events of RETAIL BANK 1. These events similarly are displayed with dotted lines and a display of the number of children events or activities. In the example, the ONBOARDING 1.2 is displayed as being highlighted or selected. The 5 events in L3 are the children events of ONBOARDING 1.2 event. At the bottom of L3 column is an option to add a new event. A user may click the + sign and type in a name for a new event.

When the new event is added, the user may enter functions or catalog items to the new event for display on the hierarchical enterprise structure 300. If the new event has children events or activities, then a new column in L4 may include the new events or activities that are children of the new event.

Figure 3D:
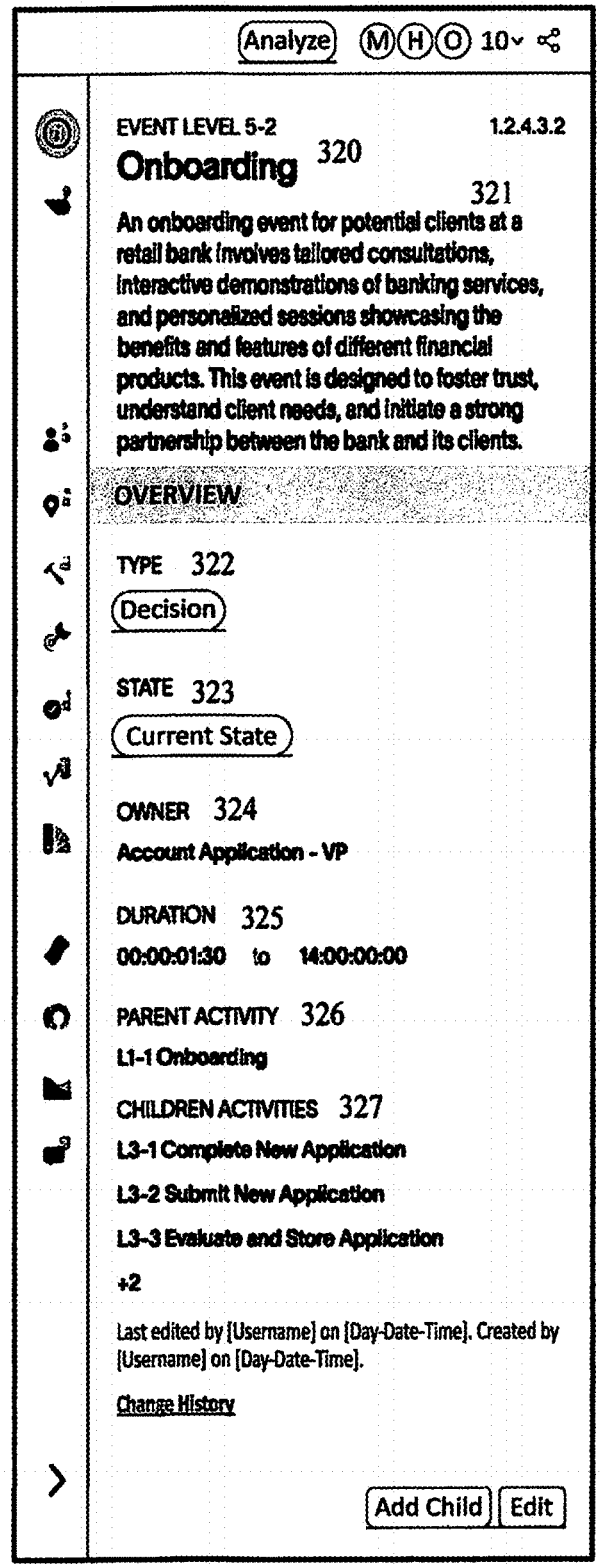
FIG. 3d is an illustration of a side panel display of event details.

FIG. 3d is an illustration of a user interface 300d of event details. In certain examples, when an event or activity is selected or otherwise highlighted in the hierarchical enterprise structure 300, a detail window of user interface 300d may be displayed on the user interface. The user interface 300d may be displayed on a panel to the right of the hierarchical enterprise structure 300 or in any other suitable location.

The event 320 is at level 5-2 and is titled "ONBOARDING." The user interface 300d depicts a smart description 321, which is a longer semi-automated description of the action or decision represented by the activity. Other details about the event 320 may be included, such as a short description and tools needed to perform the event 320.

The user interface 300d may include a type 322 of the event, a state 323, an owner 324, a duration 325, a parent 326, and children 327 of the event. Any other suitable data may be displayed in the user interface 300d.

Figure 3E:
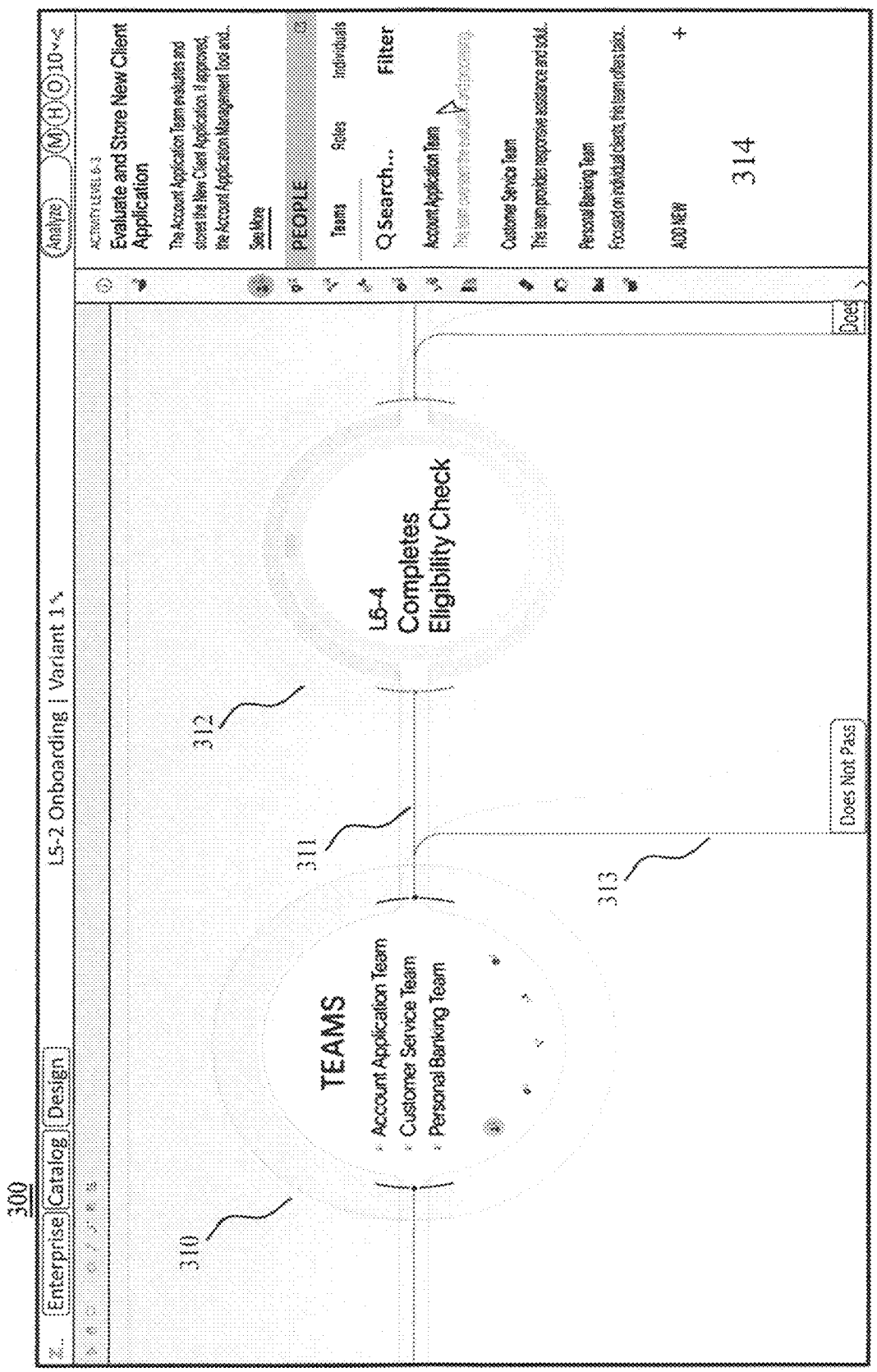
FIG. 3e is an illustration of an expanded view of an event or activity.

FIG. 3e is an illustration of an expanded view of an event 310 or activity.

A user desires to see additional details associated with an event from a hierarchical enterprise structure 300. For example, a user has identified an event from FIG. 3c that the user desires to see displayed the functions or catalog elements associated with the event. The user may click on an icon for the identified event or otherwise make a selection of the event for display.

Upon selection of the event, the event 310 is presented in an expanded view. For example, the hierarchical enterprise structure 300 display zooms in on the selected event 310. In another example, a new screen is displayed with the selected event 310. In another example, a popup window or other overlaid window is displayed of the event 310.

The expanded view of the event 310, as illustrated in FIG. 3e, allows additional details about the event to be displayed. For example, inside the icon of the event 310 is displayed a name of the event and a list of catalog elements associated with the event, such as teams that are associated with the event. The catalog elements may be displayed as links, icons, or other representations of the catalog elements. The event is displayed with the catalog elements inside the circle representing the event. Alternatively, the event 310 may be displayed with any other data or combination of data inside the circle, such as a name, children events, children activities, functions, or any other suitable data.

A line 311 out of the right portion of the circle indicates that the icon 312 to the right in L6-4 is a child event of the event 310. Other children events are depicted as being below the screen following the line 313 that exits the FIG. 3e at the bottom.

On the right portion of the display is a window 314 depicting details about the event 310. The event 310 is at level 6-3 and is titled "EVALUATE AND STORE NEW CLIENT APPLICATION." The window 314 may be similar to user interface 300d illustrated in FIG. 3d.

Figure 4A:
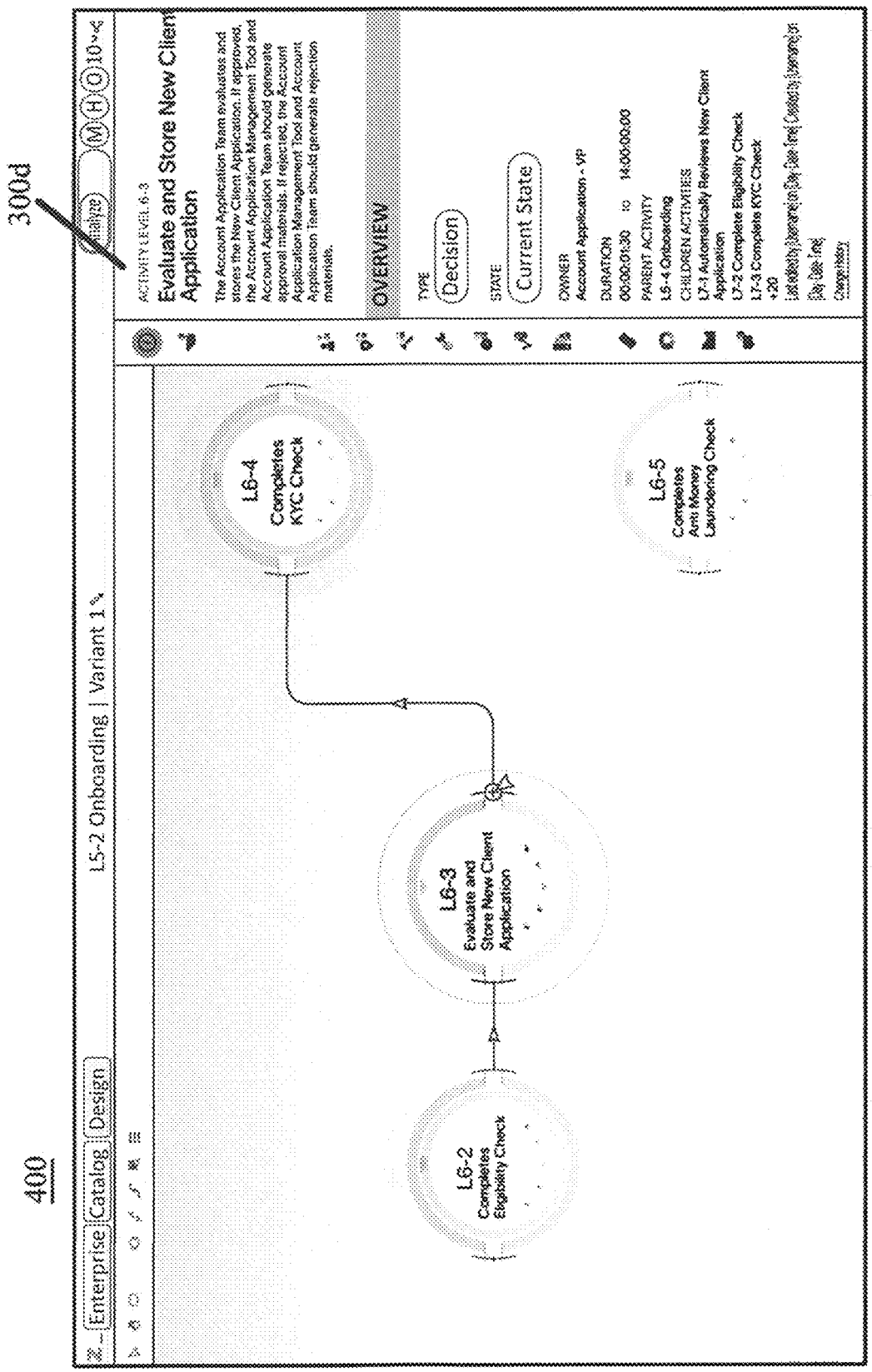

FIGS. 4a and 4b are illustrations depicting an example user interface to contextualize activities within an event.

The user interface 400 depicts a process model with activities such as Event L6-2 and Event L6-3. The events indicate a flow of the process model and each activity may include catalog elements and other elements, such as "EVALUATE AND STORE NEW CLIENT APPLICATION." Each event or activity represented may further be an event in other process models. The user interface 400a includes a panel that displays a user interface 300d, as described in FIG. 3d.

FIG. 4b illustrates an alternative user interface 400b that may be used in conjunction with user interface 300d or in place of user interface 300d. The elements or options within user interface 400b may be similar to the elements or options within user interface 300d.

The user interface 400b depicts a display to illustrate the attributes of that event to the user, such as Activity 1.2.3-7. Activity 1.1.2.3-7 is a child of Activity 1.2.3 Review. The process model application 112 may populate one or more of the entries on the user interface 400b based on the structure, such as the structure of FIG. 4a. In other examples, a user may enter data into the user interface 400b.

The user interface 400b depicts a short description in user interface 300d, which is a system-generated short description of the action or decision represented by the activity. The short description illustrated is Evaluate and Store New Client Application. The process model application 112 may extract the short description from a designation of the activity in a structure designed for a process model. Alternatively, a user may generate the short description.

The user interface 400b depicts a smart description 403, which is a longer semi-automated description of the action or decision represented by the activity. The user interface 400b depicts a Type Tag 404, which is a tag to identify if the activity represents an action or decision.

The user interface 400b lists the parent 405 of the activity and one or more children 406 of the activity. In another example, the user interface 400b depicts an entry location for a parent 405 of the activity and one or more children 406 of the activity.

The user interface 400b depicts one or more Inputs to identify the data or material catalog elements that inform inputs or are themselves inputs for that specific activity. The user interface 400b depicts one or more Outputs to identify the data or materials that result in outputs or are themselves outputs for that specific activity. The Input/Output Association identifies the materials that result in outputs or are outputs for that specific activity.

The user interface 400b depicts one or more Catalog Elements 407 that may be tagged to the activity. The catalog elements tags are used to identify the catalog elements that are involved or are relevant for that specific activity, as described herein. In the example, two People tags are displayed, one Materials tag, and one Instructions tag.

The user interface 400b depicts any relevant custom attribute 409. The attributes may be based on an organization's unique needs or any specific features of the activity. The attributes may alternatively or jointly be referred to as Work Parameters. The attributes may be attributes of Catalog Elements, Catalog Element Applications/Tags, Activities, Events, or Functions that are displayed in the structures. The attributes may be comprised of Traits, Characteristics, Factors, or other types of attributes. The purpose of the attributes is to collect and analyze qualitative information about the nature of the event that is represented in the structure.

One category of attributes is represented by Traits 408 that are user input binary data points that are used to calculate characteristics, as described herein. The traits available for elements in each structure in the process model application 112 will be driven by the attributes of the structure. For example, the following traits may be selected to describe the mindset of employees performing an event: Reflective, Proactive, Reactive, or Repetitive. In additional examples, the following traits could also be selected to describe the employer's priorities in relation to the event: Precision/Accuracy, Speed, Cost, Efficiency, Innovation, Quality, Socialization (of work), or Risk Averse.

Table 1 provides examples of Traits and attributes of the Traits.

democratic and the factors coming back from employees indicate that the decision-making process is viewed as absolute, the designer could infer that the combination of humans performing that event may not be optimal.

When appropriate the process model application 112 system will assist in the contextualization by extracting relevant information from a parent activity, such as a reference to the parent's activity object, owner, inputs (material or data-type catalog elements that inform an event), outputs (material or data-type catalog elements that are the product of an activity), and catalog element tags that are not treated as inputs or outputs. The process model application 112 will also automatically retrieve quantifiable and sub-amounts of data from the parent activity, which can regulate the child work activity to ensure that the child activity complies with the requirements of the parent activity.

In an example, a parent work event in a higher enterprise level contains a rule that the event requires no more than 60 minutes to be performed. The time requirement information is automatically disseminated to the child work activities in lower enterprise levels such that the sum of the times for any linear activities in one or more lower enterprise levels

TABLE 1

| Cognition/ Problem Solving | Responsibility/ Decision Making | Mindset | Atmosphere | Human Interaction (if more than one human is involved) | Employee Frame of Mind | Employee Priorities | Employer's Priorities in regards to employees | Employers Priorities in regard to business |
|---|---|---|---|---|---|---|---|---|
| This activity is best served by an approach that is primarily . . . | Within this activity, decisions are made . . . | This activity is . . . | This activity is . . . | Within this activity, human humans is . . . | This activity is primarily served by an aptitude that is . . . | What is prioritized during this activity . . . | What is prioritized during this activity . . . | What is prioritized during this activity . . . |
| Intuitive | By a leader | Reactive | Low Pressure | Collaborative | Physical | Personal Growth | Development/ Learning of Employees | Precision/ Accuracy |
| Logical | By a peer | Proactive | High Pressure | Independent | Communicative | Professional Growth | Health/ Well-Being of Employees | Speed |
| Concrete | By multiple peers | Reflective | Linear | Synchronous | Emotional | Recognition | Developing Connections/ Trust among Employees | Cost |
| Abstract | By someone not involved | Immersive | Nonlinear | Asynchronous |  | Satisfaction | Recognizing Employees | Efficiency |
|  |  |  |  |  |  | Compliance | Controlling Employees (Compliance) | Innovation |
|  |  |  |  |  |  | Awareness (Avoiding) Consequences Impact Exceptionalism | Utilization | Quality Socialization (of work) Risk Averse |

One category of attributes is represented by Characteristics that are universal metrics that are calculated based on the selected traits within a structure. The same characteristics may be shared across Catalog Elements, Catalog Element Instances, Activities, Events, and Functions. For example, the system may look at all of the trait selections in the Cognition/Problem Solving category to determine that the event primarily leans towards demanding Abstract Thinking and occurs within a Constraining Environment.

Factors allow for those employees to submit their feedback/experiences directly into the event including, but not limited to the form of trait input such that designers can use this data to inform future design decisions. For example, if a designer has designed decision-making in an event to be cannot be greater than 60 minutes. That is, the process model application 112 extracts any time requirement, such as in the rules of the children activities, determines a sum of total time to complete each of the children activities, and compares the sum to the time requirement of the event.

If the sum is greater than the time requirement of the event, then the process model application 112 may flag the event as having an error or a conflict and display this to the user in the form of a smart signal. The process model application 112 will monitor the activities and alert the user to revise at a higher level if the requirement is violated. A user or other operator may revise the rules of the event or the children activities to remove the conflict from the rules.

In addition to automatically aggregating and disseminating information upon detection of a parent-child relationship, the process model application 112 will employ system logic that governs which attributes are propagated up and down the hierarchy of the catalog. In addition, a user will be allowed to manually adjust any qualitative attribute that was propagated up or down based on parent-child relationships. For example, if an event requires a location of an HR office to maintain the privacy of an employee, then the user may enter a requirement that any child activity of the event must also occur in an HR office.

Figure 5:
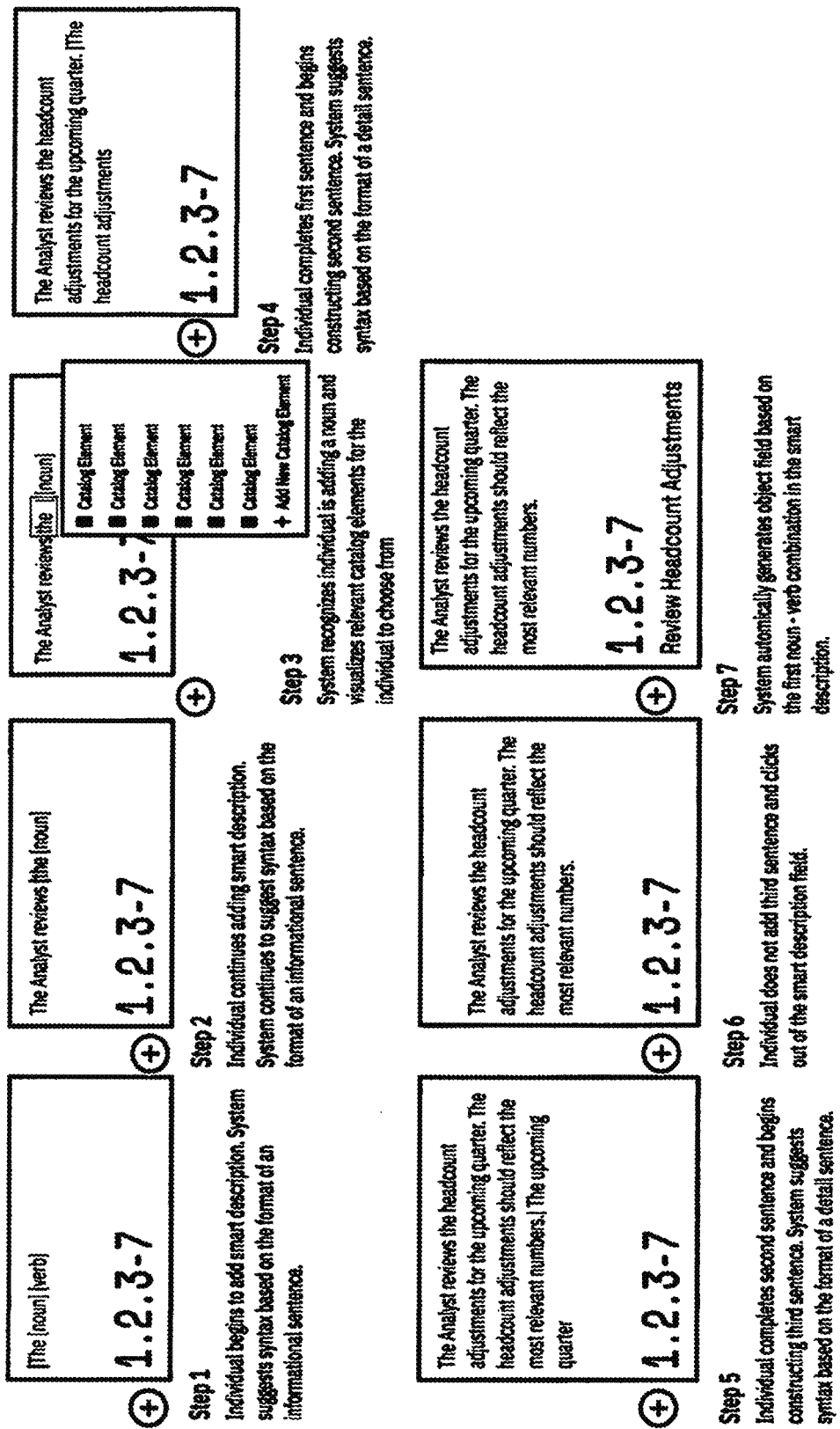
FIG. 5 is an illustration of a dynamic construction of activity descriptions in the context of events.

FIG. 5 illustrates a dynamic construction 500 of activity descriptions in the context of events. The dynamically constructed descriptions are also referred to herein as Smart Descriptions.

Each activity within process model application 112 will have a smart description field, where a user can add a longer description of the action or decision represented by the work event. This smart description may further be used to populate data into the short description field. For example, the process model application 112 may extract the first verb-noun combination in the smart description and insert the combination into the short description field.

An activity's smart description is constructed in a workspace of the process model application 112 used to build a structure. The process model application 112 allows a user to create the smart description via an easy-to-use semi-automated fill in the blank exercise when an activity or event is being added to the process model. The process enables individuals to extract elements directly from an enterprise's catalog 113 of elements or create new elements to populate the smart description. By enabling users to pull elements directly from the catalog 113 and to tag those elements within the text of a description, a centralized source of data points that are easily referenced throughout an enterprise will be further established. Catalog elements tagged in a description may also populate as a catalog element tag for that activity.

FIG. 5 illustrates the dynamic creation of the smart description. In Step 1, the user begins to add smart descriptions. As illustrated, Activity 1.234 is being described. The cursor is presented at the top of the window of Step 1. The suggested start to the sentence is the word "The." The process model application 112 suggests that a noun and verb be determined for the description.

The smart descriptions are structured into two types of sentences: informational and detailed sentences. The process model application 112 will dynamically determine which type of sentence an individual is constructing based on syntax and make suggestions on the type of language that should be used to complete the sentence. In the example, the process model application 112 suggests syntax based on the format of an information sentence.

In Step 2, the user has added a portion of the smart description. The process model application 112 continues to suggest syntax based on the format of an informational sentence. The user has entered "The analyst reviews," and the process model application 112 suggests "the [noun] as the next entry. The process model application 112 has determined that an informational sentence is being entered with a noun performing a verb to an object.

In Step 3, the process model application 112 recognizes that the user is adding a noun as the object of the sentence and presents a dropdown list of relevant catalog elements for the user to select. The display of relevant catalog elements may be presented in any other suitable format, such as a popup window or a split screen. The relevant catalog items may be based on any logical determination of the process model application 112. For example, the suggestions may be based on entries by the user for previous smart descriptions, entries by other users, catalog items typically associated with certain types of activities, or any other relevant data.

As sentences are constructed in the Smart Description field, the process model application 112 will display the catalog items that could be applicable to the activity and, when relevant, populate those items into the smart description. This interaction could be accomplished by autofill, by a drag and drop interaction, or by any indication from a user. If a relevant element is not in the catalog 113, the process model application 112 will allow a catalog item to be added directly from the smart description. The new catalog item may be stored in the catalog 113 and presented for subsequent smart description population.

Catalog elements may be suggested in the display based on an association with the activity, such as Activity 1.234. The catalog item may be relevant because the catalog item was previously associated with a similar activity or is a frequent catalog item for the user. In another example, the catalog element is determined to be relevant because of an association with the parent, sibling, or children activities of the activity being described. For example, if the parent event has a catalog element of a particular time frame such as "weekly," the activity being described may have the same catalog element populated in a dropdown menu or autofilled. In another example, if a sibling event has a catalog element of a particular location, such as "file room," the activity being described may have the same catalog item populated in a dropdown menu or autofilled.

The catalog element may be tagged to the activity at the same time that the catalog element is selected for the smart description. That is, if a user selects a catalog element of "trained technician" from a dropdown menu or other selection menu to add to a smart description, the catalog item of "trained technician" may also be tagged to the activity for display in other locations or presentations of activities, such as on a structure.

The process model application 112 may employ predictive text (to predict the catalog element based on the letters typed, predict the next verb based on the letters typed) and smart tags (to allow individuals to tag existing catalog elements) as users fill out Smart Descriptions.

Activity Smart Description

As described the process model application 112 utilizes activity smart descriptions that may describe the actions that occur within one tool. Similar to the described process for the structure of a smart description associated with a regular activity, activity smart descriptions may be composed of two types of sentences: informational sentences and detail sentences.

Informational sentences are designed to provide context and may resemble conditional statements in programming. Informational sentences are generally constructed via a conditional clause, to provide context to the rest of higher-level automated activity smart description, and an action clause.

Informational Sentence Format (by Clause Type)

The following sentence construction is an example of an informational sentence.

Conditional Clause+Action Clause+Conjunction (Else, And, Then)+[0 . . . 4] Action Clause In the examples throughout this section and succeeding sections, clauses or words that are italicized are not required to be included in the sentence. Those italicized clauses are optional. In the example and in other examples, [X . . . . Y] indicates that X to Y words or clauses may be used in this location. The X and the Y may represent any number of minimum or maximum words or clauses respectively. For example, different examples may use [1 . . . 4], [0 . . . 5], or any other suitable example. [1 . . . 4] would indicate 1 to 4 words or clauses while [0 . . . 5] would indicate 0 to 5 words or clauses.

Conditional Clause Format (by Parts of Speech and Catalog Elements)

Conditional clauses will be generally constructed with the following syntax.
(Conjunction (If, While) or Preposition (On, For, Before, etc.))+[1 . . . 5] ((Noun or Catalog Element)+(Verb or Adjective)+(Adjective or Noun))

Three examples using this format are presented below. Note that the examples are clauses and not complete sentences.
Example 1: If Data Field 2 equals true and Data Field 3 equals false
Example 2: On Wednesday
Example 3: At 10 PM Action Clause Format (by Parts of Speech and Catalog Elements)

Action clauses will be generally constructed with the following syntax:
Tool Catalog Element+Verb+Adjective (Numerical)+(Data or Material Catalog Element or Noun)+Preposition+Adjective (Numerical)+[1 . . . 5] (Data or Material Catalog Element or Noun)

Three examples using this format are presented below.
Example 1: The BUF/RFP makes headcount adjustments by pay grade
Example 2: The BUF/RFP makes headcount adjustments by pay grade for individual cost centers
Example 3: John takes out the garbage for the day Conditional and Action clauses may be combined to form a sentence. Multiple combined conditional and action clauses can be combined when required. When the conditional and action clause are combined, the format will align to the following syntax:

Informational Sentence Format (by Clause Type)

Conditional Clause+Action Clause+Conjunction (Else, And, Then)+[0 . . . 4] Action Clause Informational Sentence Format (by Parts of Speech and Catalog Elements)

(Conjunction or Adjective or Preposition)+[1 . . . 5] ((Noun or Catalog Element)+(Verb or Adjective)+(Adjective or Noun))+Tool Catalog Element+Verb+Adjective (Numerical)+(Data or Material Catalog Element or Noun)+Preposition+Adjective (Numerical)+[1 . . . 5] (Data or Material Catalog Element or Noun)+Conjunction (Else, And, Then)+[0 . . . 4] Action Clause Four examples using this format are presented below.
Example 1: On Tuesday, the BUF/RFP makes headcount adjustments by pay grade.

Example 2: If we are in a quarterly review, the BUF/RFP makes headcount adjustments by pay grade for individual cost centers.
Example 3: At 10 PM on Tuesday, John takes out the garbage for the day.

Detail sentences are designed to provide additional details in support of informational sentences. Detail sentences may reference a tool, data, or material catalog element listed in the related informational sentence action clause.

For example, if an informational sentence is: "At 8 AM, Industrial Machine B generates Material D from Material A," then a detail sentence could reference:
Industrial Machine B
Material D
Material A
The complete detail sentence may be:
Industrial Machine B generates Material D within 10 minutes.

Detail Sentence Format (by Clause Type)

Detail sentences themselves are made up of action clauses as indicated:
Action Clause+*Conjunction (And, Or)*+*[0 . . . 3] Action Clause*

Actions clauses may be constructed based on the syntax employed for action clauses in informational sentences. When the conditional and action clauses are combined the format will align to the following syntax:
Action Clause+Conjunction (And, Or)+[0 . . . 3] Action Clause Detail Sentence Format (by Parts of Speech and Catalog Elements)

Tool Catalog Element+Verb+Adjective (Numerical)+(Data or Material Catalog Element or Noun)+Preposition+Adjective (Numerical)+[1 . . . 5] (Data or Material Catalog Element or Noun)+Conjunction (And, Or)+[0 . . . 3] Action Clause Four examples using this format are presented below.
Example 1: The headcount adjustments are stored in the management database and should be retrievable at any time.
Example 2: The garbage is thrown out daily.

In Step 5, the process model application 112 receives input from the user completing the second sentence and begins constructing the third sentence. The process model application 112 suggests syntax based on the format of a detail sentence.

In Step 6, the process model application 112 receives input exiting the input field of the smart description instead of completing the third sentence. In this example, the user did not desire a third sentence for the smart description.

In Step 7, the process model application 112 automatically generates a short description based on the verb-noun combination of the verb and the object of the verb in the smart description. In this example, the first was "review," and the short description of the review was "headcount adjustments." The short description field may be the title of the element, such as element 1.234. When this event, activity, function, or other element is referenced, the short description field may be displayed as an identifier of the Activity 1.234.

FIG. 6 illustrates the structure of work parameters, such as characteristics, traits, and attributes in events. To contextualize and compare the activities, events, and catalog elements that comprise an event and categories of persons, places, data, tools, materials, instructions, and other categories in an enterprise within the process model application 112, such as the catalog elements as described herein, the process model application 112 provides a set of activity and catalog element parameters. The process model application 112 categorizes the parameters as attributes, traits, and characteristics.

Attributes may include a set of properties that may be used to provide additional context about a process activity or a supporting resource. For example, the attributes of an activity or event could include the owner, duration of time (the time it takes for an activity to complete), the cost associated with the activity, or other suitable attributes.

For a catalog element, attributes could include the owner, training requirements (the training available for a specific tool), motivation (a description of what motivates a specific role/employee), or other suitable attributes.

In certain examples, attributes are configured or programmed by individuals as they contextualize activities and catalog elements. In other examples, the process model application 112 may extract attributes from other data, such as from a database or from previous instances of an event. For example, the process model application 112 may recognize that another event has a similar parent and children, and requires similar materials and personnel. The process model application 112 may associate an attribute with the event based on the similarities to the other event. In another example, a user that is configuring the event in the process model application 112 recognizes that the event requires a software analyst to perform the event. The user may associate the personnel title of Software Analyst with the event.

Traits are attributes of both activities and catalog elements. Catalog elements and activities may have different trait selections available. The traits define the nature of the activities and catalog elements (such as that an activity occurs within a highly secure work environment or that an activity has a high degree of feedback). Similar to attributes, users can select or unselect the traits that are relevant when contextualizing activities and catalog elements with the help of a set of prompts.

In examples, traits are a set of Boolean (yes/no) descriptors that may be used to describe an event or activity, such as the nature of work being performed in the event, or a supporting resource. The set of traits to describe an activity may include the traits of intuitive, logical, and concrete. The set of traits to describe various resources utilized to complete an activity may include the traits of reactive, proactive, and reflective.

Traits data may be collected via a digital form that individuals involved in the process activity may use to identify which traits are relevant to both the activity as a whole and the resources the individuals will utilize to complete the activity. The trait data may be collected from any other source, such as being extracted from metadata associated with an automated process. In another example, the trait data may be provided by a machine learning process or artificial intelligence program that has evaluated the parameters of a process.

The traits may be requested and provided in a user interface or other format such as illustrated below.

1. "Please select the word that best completes the following statement. This activity is best served by an approach/aptitude that is:"

| Answer Set 1 | Answer Set 2 | Answer Set 3 | Answer Set 4 | Answer Set 5 |
|---|---|---|---|---|
| Intuitive Logical | Concrete Abstract | Reactive Proactive | Reflective Immersive | Physical Communicative Emotional |

2. "Please select the word that best completes the following statement. This activity is:"

| Answer Set 1 | Answer Set 2 |
|---|---|
| Low Pressure High Pressure | Linear Nonlinear |

3. "Please select the word that best completes the following statement. Within this activity, human behavior is:"

| Answer Set 1 | Answer Set 2 |
|---|---|
| Collaborative Independent | Linear Nonlinear |

4. "Please select the word that best completes the following statement. Within this activity, decisions are made:"

| Answer Set 1 | Answer Set 2 (available when a user selects by those directly involved in Answer Set 1) | Answer Set 3 (available when a user selects by those not directly involved in Answer Set 1) |
|---|---|---|
| By those directly involved | By a leader | By a leader |
| By those not directly involved | By a peer | By a peer |
| | By multiple peers Unsure | By multiple peers Unsure |

By providing these inputs, the users that are directly involved with a particular process can provide inputs that are used to configure a final set of traits to be associated with an activity or an event. The traits may be used by the system or a person that is determining what type of person, machine, process, material, or location to use for a particular activity or event. The traits may be used by the system or a person that is grouping events or activities, sorting events or activities, or in any other way analyzing the events or activities to identify common or uncommon traits.

Characteristics are the result of compiling the traits data collected for a given object (either an activity, event, or a resource utilized within activities). The same set of characteristic ranges can be employed for both the resources needed to complete a work activity and the work activity or event itself in that it provides a consistent set of metric-based descriptors to compare both (low-level and high-level) activities and catalog elements in the context of the process. Characteristics may consist of a set of spectrums. Each trait is correlated to a specific range within the characteristic spectrum. When a trait's value is "Yes," the corresponding range of each characteristic spectrum is affected. Conversely if a trait's value is "No," the corresponding range of the characteristic spectrum is unaffected.

The characteristics represent the different dimensions an activity, event, or catalog element could have and operate as spectrums. For example, the spectrum may display that an activity is more reliant on emotional understanding than analytical understanding or more focused on the individual than the collective. Characteristics apply to events and activities at any level of the enterprise. Unlike attributes and traits, characteristics are automatically generated based on a set of algorithmic relationships that directly reference traits.

Figure 6A:
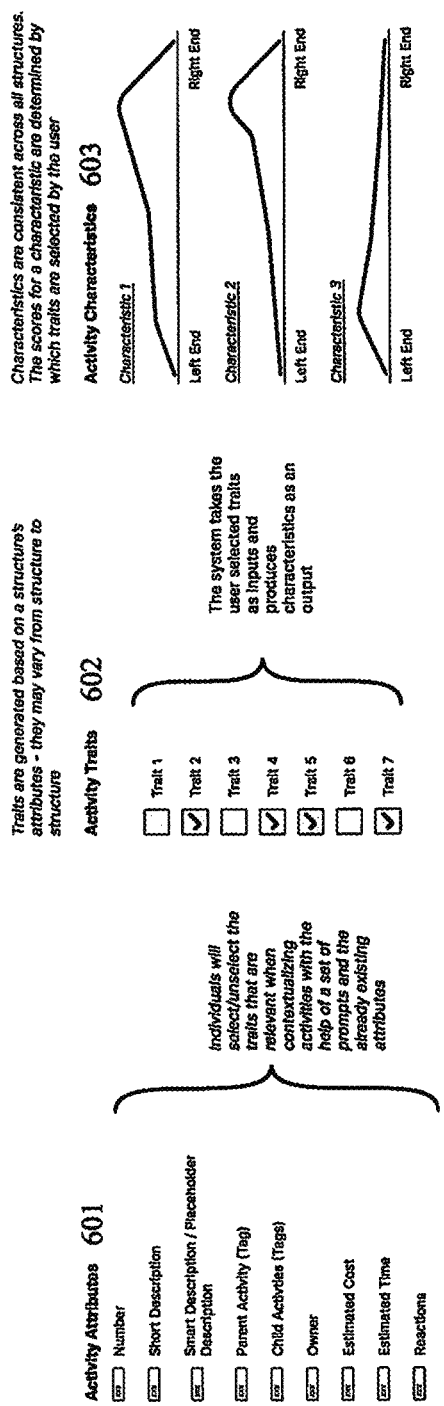

In FIG. 6a, a structure of work parameters illustrates a visualization 600 to allow a user to designate attributes and traits to determine activity and catalog element characteristics. In the visualization 600, a list of activity attributes 601 are presented to a user for selection and modification. The user may elect whether not to address/interact with an attribute. For example, a user may enter an input for a Number, Owner, and Estimated Cost. Activity traits 602 are generated based on a structure's selected attributes. The activity traits 602 may vary from structure to structure. Example activity traits may include traits such as High Pressure, Immersive, Physical, or Linear.

The process model application 112 receives the selections of activity traits and produces activity characteristics as an output. A list of activity characteristics 603 is any display of characteristics that is generated to further contextualize the activity. The display may be a series of slider bars, bar graphs, line graphs, pie charts, or any other suitable display. The activity characteristics 603 displayed are illustrated with a line graph. This display lists the generated characteristics, and the line graph illustrates the magnitude of each characteristic from a left extreme to a right extreme. The magnitude may be related to the amount of that characteristic associated with the activity. For example, the characteristic that is generated may have extremes of "independent" and "collaborative." That is, the characteristic describes how independent or collaborative an activity may be based on how many employees must work together to perform the activity. In another example, a characteristic may have extremes represented by "emotional understanding" or "analytical understanding." That is, the characteristic describes the primary form of understanding employees must have while completing an activity. The line graph may move up or down as the line graph traverses from the left to the right based on how closely the employees must work together. As the line graph is raised higher, the more collaboration is associated with the activity. Any other suitable display, graph, list, or chart may be used to illustrate the characteristics, such as a bar graph or simply a list of characteristics with a description of the magnitude.

In the visualization 600, a list of catalog element attributes 604 are presented to a user. Based on the listed catalog element attributes, the system will generate a list of potential traits that may be used to further describe the catalog element. Catalog element traits 605 are generated based on catalog element attributes. The catalog element traits 605 may vary from structure to structure. For example, a user might select traits 5, 7, 8, and 11 to further describe the catalog element.

The process model application 112 receives the selections of catalog element traits and produces catalog element characteristics as an output. A list of catalog element characteristics 606 is any display of characteristics that is generated to further contextualize the activity. The display may be a series of slider bars, bar graphs, line graphs, pie charts, or any other suitable display. The activity characteristics 606 displayed are illustrated with a line graph. This display lists the generated characteristics, and the line graph illustrates the association of the activity with each characteristic. The magnitude may be related to the amount of that characteristic associates with the catalog element. Any other suitable display, graph, list, or chart may be used to illustrate the characteristics, such as a bar graph or simply a list of characteristics with a description of the magnitude. The display may illustrate the range of a characteristic on a spectrum, as an absolute value, or in any other suitable measure.

The process model application 112 provides algorithmic relationships and application of work parameters (Characteristics, Traits, and Factors).

Work parameters throughout the process model application 112 may have algorithmic relationships with other parameters. For example, a user may have a set of traits to review and select/unselect, as described in FIG. 6, that have a direct relationship with the characteristics specific to activities and catalog elements. As the individual selects the available traits, the process model application 112 will translate the effect of the selected/unselected traits on the character of an activity. For example, if Trait 1 and Trait 2 are selected, Characteristic B will move to one end of the spectrum based on the trait selections. Once a user has reviewed the different traits, the user will then have a view of the character of that activity based on the traits that were selected/not selected.

In an example, a characteristic of an activity may be the level that an activity is tacit or implicit. As the characteristic becomes more tacit or more implicit, the height of the bar graph raises or lowers as the line graph moves from left to right. In an example in which an activity is more tacit, a user may determine that a person with greater experience is required to perform the activity well. In an example in which an activity is more implicit, then a user may determine that a person with any amount of experience may perform the activity well.

Traits under the characteristics may be more immediate and relatable than a high-level characteristic. For example, traits for an activity may indicate that creativity is needed, but that collaboration is not. This activity would then be determined to be more tacit and less implicit. Without collaboration, an employee would have fewer opportunities to discuss the work required. With more creativity implied, then the performance is more difficult to measure. These traits support the characteristic that the activity is more tacit.

FIG. 6b illustrates how different traits affect different parts of different characteristic spectrums.

Characteristics may be plotted as an area chart where the y axis represents the total number of traits collected relevant to the characteristic. Each trait that has a Yes value will increase the y height of the plot by one unit in the affected areas of the characteristic charts. For example, the trait 1 is shown with a single Yes value. The Yes value of trait one increased the y value of Characteristic 1 by a single unit (+1).

The placement of the effect of Trait 1 on the chart for Characteristic 1 is illustrated by the width of the Yes value along the x value of the chart. The x width represents the changing strength or intensity of the Characteristic 1. The location of the Yes value along the x width of charts may be configured by the system and may have different ranges for one trait over another trait. As illustrated Trait 2 affects a different portion of the x width and has a wider range of the x width. Trait 3 affects Characteristic 1 in two locations. Each section of the effect received a plus 1 in the y direction.

In FIG. 6c, when a single trait has a Yes value, the value may affect multiple ranges on each characteristic spectrum. For example, if the response to question 1 above is "Intuitive: Yes," or "Logical: No," the characteristics derived from the traits selection may be affected in the different ranges.

In the illustration, Trait 1 has an effect on Characteristic 1 that causes the range to be towards the left Characteristic Extreme. The range is raised +1 in the y direction. As depicted, the effect of Trait 1 on Characteristic 1 is the same in the first item on FIG. 6b as the effect of Trait 1 on Characteristic 1 in the first item on FIG. 6c.

Trait 1 has an effect on Characteristic 2 that causes the range to be towards the left Characteristic Extreme. The range is raised +1 in the y direction. Each different characteristic is affected differently by a single Trait 1 selection.

FIG. 6d represents an area chart of the data that has been collected. Once data has been collected for some or all of the traits, the characteristics of a process activity or a supporting resource may look like the area chart depicted in FIG. 6d or any other suitable graph or chart to represent the characteristics. The area chart may sum the changes to the characteristic provided by each trait in each zone of the Characteristic Extreme ranges. The sums may be smoothed into an area chart using any mathematical means. In FIG. 6d, the Characteristic 1 has an area chart that shows a bimodal effect. The Characteristic 1 has a largest spike or curve at the middle range of the Characteristic Extremes.

Traits and characteristics throughout the process model application 112 may have algorithmic relationships with other parameters. For example, a user may have a set of traits to review and select/unselect, as described in herein, that have a direct relationship with the characteristics specific to activities and catalog elements. As the individual selects the available traits, the work model application 112 translates the effect of the selected/unselected traits on the character of an activity. For example, if Trait 1 and Trait 2 are selected, Characteristic B will move to one end of the spectrum based on the trait selections. Once a user has reviewed the different traits, the user will then have a view of the character of that activity based on the traits that were selected/not selected.

In an example, the Characteristic 1 may be whether an activity is more narrowly focused or more broadly focused. After summing the effect of the traits on Characteristic 1, the area chart is displayed, such as with narrow focused on left and broadly focused on the right. In an example in which an activity is more broadly focused, the height of the chart on the right side of the graph may be higher than the height on the left side. In this case, a user may determine that a person with greater experience is required to perform the activity well. In an example in which an activity is more narrowly focused, then a user may determine that a person with any amount of experience may perform the activity well. The user of the chart may observe at a glance that the activity is more tacit and know which type of operator is required to perform the activity.

In another example, a characteristic might evaluate how "individual centric" or "collective centric" an activity may be. The area chart may move left to right based on how closely the employees must work together. The characteristic display may be an area chart, or any other type of display. As illustrated in element 606 of FIG. 6a, the display lists the generated characteristics, and the slider bar illustrates where within the breadth/range/dimension of each characteristic the activity falls. Any other suitable display, graph, list, or chart may be used to illustrate the characteristics, such as a bar graph or simply a list of characteristics with a description of the magnitude. The display may illustrate the range of a characteristic on a spectrum, as an absolute value, or in any other suitable measure.

Figure 7A:
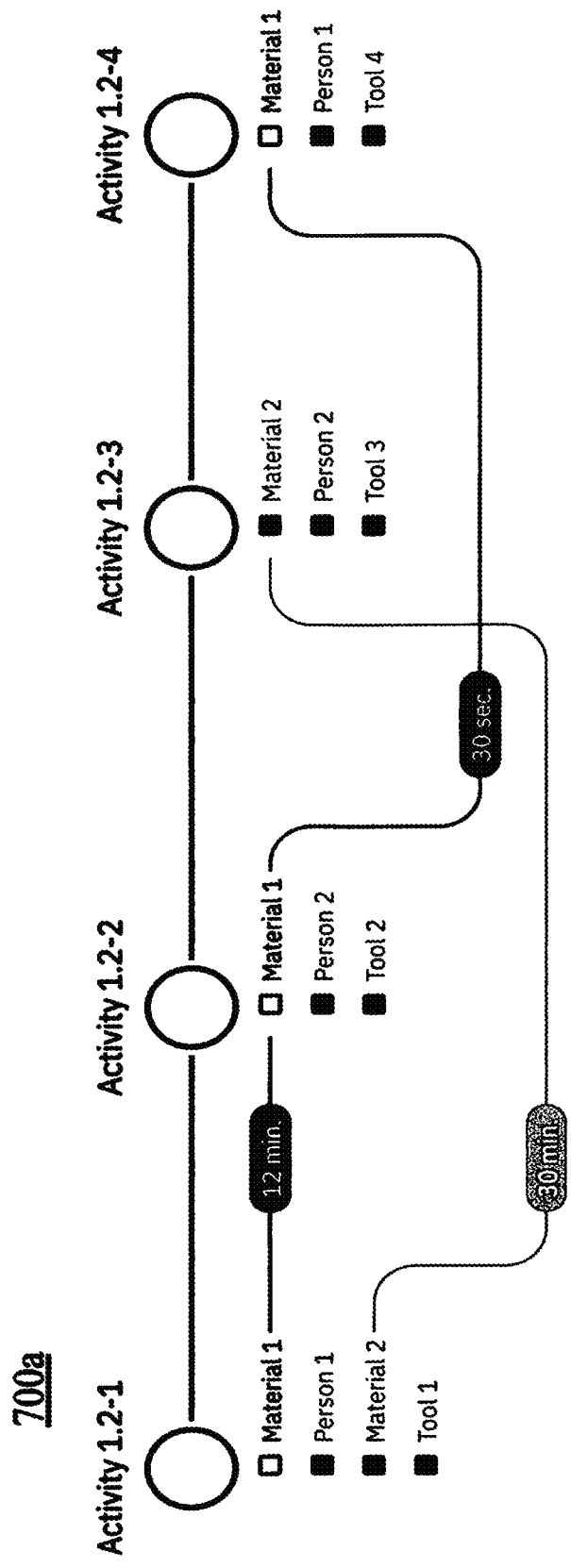
FIGS. 7a and 7b are illustrations of contextualization and storage of the movement of data and materials of activities.
Figure 7B:
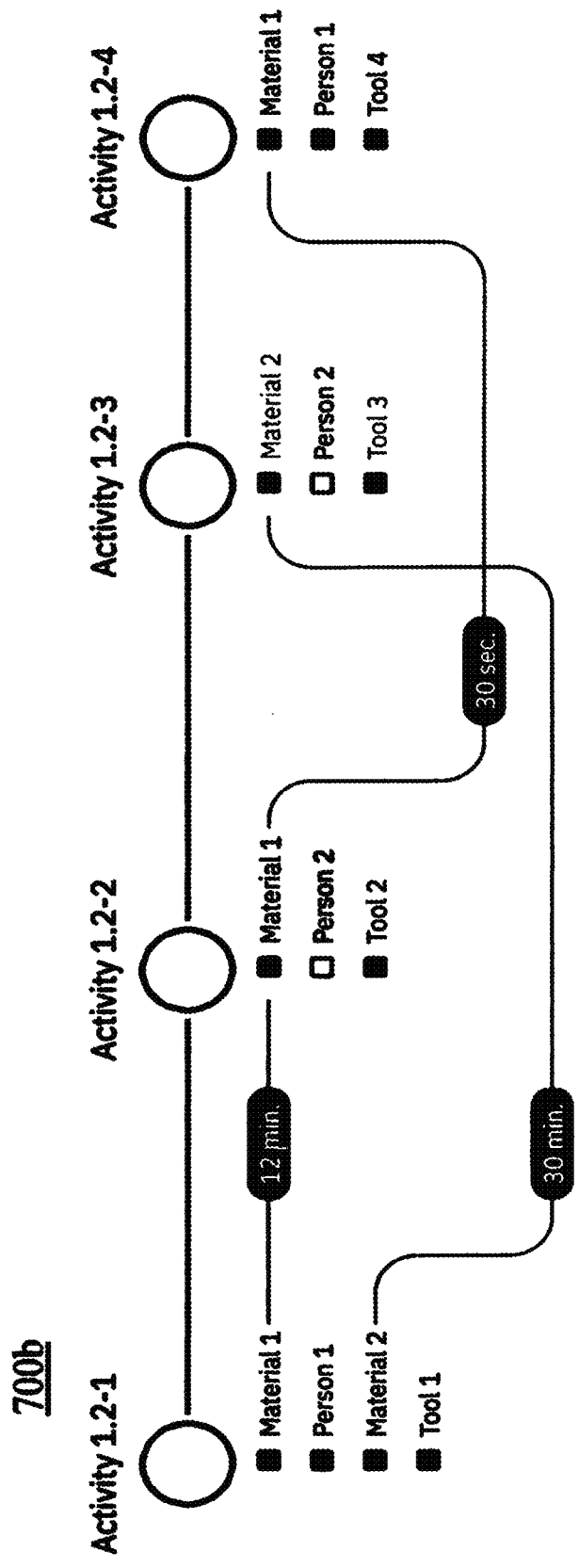

FIGS. 7a and 7b are illustrations of the contextualization and storage of the movement of data and materials of activities. This process allows users, by way of inputs, outputs and input/output associations, to identify the materials, both physical and digital, that inform and are the product of different activities.

Users of the process model application 112 are able to tag any existing data and material catalog elements or data catalog elements from the Catalog as an input or output specific to an activity. The tagging of the catalog elements associates inputs and outputs among two or more activities by using an Input/Output Tool in the process model application 112. Users can associate inputs and outputs upon creation of the activity or at a later time. When an association is made users will have the opportunity to add appropriate attributes, such as association/transfer method type, association/transfer time, or other attributes. By adding this information, the process model application 112 is able to more accurately reveal the amount of time an event would take, a route a data or material may take, the steps a particular person must take, or any other suitable process flow requirement.

In the example of FIG. 7a, a user interface 700a illustrates an Activity 1.2-1 with a tagged Material 1 that moves to Activity 1.2-2 and then to Activity 1.2-4. The material may be an input or an output of Activity 1.2-1. The line exiting Material 1 may be followed to Activity 1.2-2 and then on to Activity 1.2-4 to indicate the flow of Material 1. Similarly, a data catalog element may be tagged and tracked through a process flow in a similar manner. For example, if a database is required to perform multiple activities, the user interface 700a may follow a line from one activity to another with the same database tagged in both activities. In alternate examples, other types of catalog elements may similarly be tagged and tracked through a process flow, including, but not limited to a person, employee, information, material, or any other resource.

Within the events, users will be able to highlight specific catalog elements and input/output associations to isolate specific elements in the foreground, while irrelevant overlapping input/output associations fade into the background. As illustrated in FIG. 7a, the Material 1 flow is shown as darkened while the flow of Material 2 is grayed out.

Further, the line between Activity catalog elements indicates an amount of time required to flow between Activities. In the example, Material 1 has 12 minutes to proceed from Activity 1.2-1 to Activity 1.2.2. Material 1 has 30 seconds to proceed from Activity 1.2.2 to Activity 1.2-4. The time requirements may be based on historical usage times, imposed rules, guidelines, or based on any other standard. If an activity, such as Activity 1.2.1 takes a greater amount of time than the requirement, the tag may provide a notification to a user that the subsequent activities are not going to meet the time requirements.

In the example of FIG. 7b, a user interface 700b illustrates an Activity 1.2-1 with a tagged Person 1, an Activity 1.2-2 with a tagged Person 2, an Activity 1.2-3 with a tagged Person 2, an Activity 1.2-4 with a tagged Person 1. In this example, a line is not drawn between one or more Persons, but the tagged Person may be highlighted based on other indicators. In FIG. 7b, Person 2 is highlighted as associated with Activity 1.2-2 and Activity 1.2-3. Person 2 is highlighted by being indicated in bold lettering while the other tagged items are grayed out. By highlighting Person 2, a user may visually be notified that the same Person is required for the two activities.

Automated Process Flow/Process Model Driven Creation of a Work Implementation Spec (User Stories, Functional Requirements, Etc.)

The process model application 112 is a tool that will automatically translate a dynamic events created within the process model application 112 into several outputs for users that will ultimately comprise a work implementation specification. This specification will enable diverse users to translate dynamic, hierarchical process models and process flows to a work implementation specification to provide users with user stories, functional requirements, and other documentation that illustrates the process.

The activities described previously have been primarily associated with actions or decisions driven by humans, such as to create a product, perform a task, or make a decision. However, activities may also reflect steps within a process that are driven by a tool, a piece of equipment, or other automated actor. Such an activity may be described as an automated activity.

Automated activities represent steps in a process that occur without human interference, such as within one tool or by way of one piece of equipment. In an example, a user submits a report into an enterprise system, and the enterprise system automatically saves the file and distributes the file into a variety of different file locations. That portion of the activity associated with the saving of the file and the distribution of the file is an automated activity because the system performed the task automatically without direction of the user.

Some of the same attributes that are identified for a typical activity (such as an owner or a duration of the task) are identified for an automated activity. In addition, other types of attributes, such as logic/calculation, error, error resolution, prior format, and subsequent format attributes, may be identified. The identification may be made through data and materials catalog element instances and states.

Similar to a typical activity, automated activities can be made up of other activities, such as other automated activities. If the process model application 112 recognizes that a non-automated activity, which is the child of an automated activity, goes beyond an acknowledgement by a human, such as requiring an action that takes a somewhat significant amount of human interaction, the process model application 112 will push the user to convert that non-automated activity into an automated activity.

Similar to human-related activities described herein, each automated activity within the process model application 112, such as steps within a business process that are driven by a tool or piece of equipment, may have a smart description field. In the description field, users may add a longer description of the automated action or decision represented by the work activity.

Similar to other smart descriptions described herein, a smart description for an automated activity is constructed in the process model application 112 through a semi-automated predictive/guiding text. The exercise will enable individuals to pull elements directly from an enterprise's catalog or create new elements. By enabling users to pull elements directly from the catalog and to tag those elements within the text of a description, a centralized source of data points that are easily referenced throughout an enterprise will be further established. Any catalog elements tagged in a description will also populate as a catalog element tag for that activity.

As more smart descriptions are added to the system, the smart descriptions will enable the process model application 112 system to detect patterns that indicate with which the type of activities specific catalog elements are involved and which types of actions that take place within certain types of processes. As the number of smart descriptions increase and are associated with activities, these insights may be integrated into the process model application 112 to be populated automatically by the system into an event or activity via pre-generated smart descriptions and activities. The system would be able to recognize the type of activities that belong in a certain type of process and employ that knowledge though pre-generated activities. With additional data inputs, the process model application 112 will achieve improved performance at interpreting the syntax, process, and format in which individuals create a first draft of smart descriptions. The process model application 112 may allow for a more flexible structure based on the breadth of the inputs.

Similar to human-related activities described herein, automated activities can be made up of one or more other activities. Smart descriptions for these automated activities can be differentiated based on whether the activities are a higher-level automated activity made up of other automated activities or a low-level automated activity.

Low-level automated activity smart descriptions operate at the lowest level of detail. In an example, the process model application 112 recognizes that there are two automated activities that employ a low-level automated activity smart description, such as with one activity being the child of the other. The process model application 112 will generate a smart signal that informs the user that low-level automated activity smart descriptions should only be employed at the lowest level of detail.

Additionally, if the process model application 112 recognizes that a user has employed a high-level automated activity smart description with multiple action clauses, as described herein, the process model application 112 will determine if that automated activity has child automated activities. If not, the process model application 112 will suggest and automatically generate (if the user opts to create) child automated activities for the user to complete based on the actions in the high-level automated activity smart description. A user will be notified that child automated activities have been created via smart signals.

High-Level Automated Activity Smart Description

High-level automated activity smart descriptions may describe the actions that occur within one tool. Similar to the described process for the structure of a smart description associated with a regular activity, automated activity smart descriptions may be composed of two types of sentences: informational sentences and detail sentences.

Information sentences are designed to provide context and may resemble conditional statements in programming. Information sentences are generally constructed via a conditional clause, to provide context to the rest of higher-level automated activity smart description, and an action clause.

Informational Sentence Format (by Clause Type)

The following sentence construction is an example of an informational sentence.
Conditional Clause+Action Clause+Conjunction (Else, And, Then)+[0 . . . 4] Action Clause
In the examples throughout this section and succeeding sections, clauses or words that are italicized are not required to be included in the sentence. Those italicized clauses are optional. In the example and in other examples, [X . . . . Y] indicates that X to Y words or clauses may be used in this location. The X and the Y may represent any number of minimum or maximum words or clauses respectively. For example, different examples may use [1 . . . 4], [0 . . . 5], or any other suitable example. [1 . . . 4] would indicate 1 to 4 words or clauses while [0 . . . 5] would indicate 0 to 5 words or clauses.

Conditional Clause Format (by Parts of Speech and Catalog Elements)

Conditional clauses will be generally constructed with the following syntax.
(Conjunction (If, While) or Preposition (On, For, Before, etc.))+[1 . . . 5] ((Noun or Catalog Element)+(Verb or Adjective)+(Adjective or Noun))
Three examples using this format are presented below. Note that the examples are clauses and not complete sentences.
Example 1: If Data Field 2 equals true and Data Field 3 equals false
Example 2: On Wednesday
Example 3: At 10 PM Action Clause Format (by Parts of Speech and Catalog Elements)

Action clauses will be generally constructed with the following syntax:
Tool Catalog Element+Verb+Adjective (Numerical)+(Data or Material Catalog Element or Noun)+Preposition+Adjective (Numerical)+[1 . . . 5] (Data or Material Catalog Element or Noun)
Three examples using this format are presented below.
Example 1: Database A runs multiple system checks
Example 2: Tool C transforms wood into two pieces
Example 3: Industrial Machine B generates Material D from Material A
Conditional and Action clauses may be combined to form a sentence. Multiple combined conditional and action clauses can be combined when required. When the conditional and action clause are combined, the format will align to the following syntax:

Informational Sentence Format (by Clause Type)

Conditional Clause+Action Clause+Conjunction (Else, And, Then)+[0 . . . 4] Action Clause Informational Sentence Format (by Parts of Speech and Catalog Elements)

(Conjunction or Adjective or Preposition)+[1 . . . 5] ((Noun or Catalog Element)+(Verb or Adjective)+(Adjective or Noun))+Tool Catalog Element+Verb+Adjective (Numerical)+(Data or Material Catalog Element or Noun)+Preposition+Adjective (Numerical)+[1 . . . 5] (Data or Material Catalog Element or Noun)+Conjunction (Else, And, Then)+[0 . . . 4] Action Clause
Four examples using this format are presented below.
Example 1: On Tuesday, Database A runs multiple system checks.
Example 2: If Data Field 2 equals true, Data Field 3 equals false, and the Time is 10 PM, Industrial Machine B generates Material D from Material A.
Example 3: If Data Field 2 equals true, Database 2 splits off Data Table 5 and Database 3 splits off Data Table 7.
Example 4: If Data Field 2 equals true, Database 2 splits off Data Table 5 else Database 3 splits off Data Table 7.
Detail sentences are designed to provide additional details in support of informational sentences. Detail sentences may reference a tool, data, or material catalog element listed in the related informational sentence action clause.
For example, if an informational sentence is: "At 8 AM, Industrial Machine B generates Material D from Material A," then a detail sentence could reference:
Industrial Machine B
Material D
Material A
The complete detail sentence may be:
Industrial Machine B generates Material D within 10 minutes.

Detail Sentence Format (by Clause Type)

Detail sentences themselves are made up of action clauses as indicated:
Action Clause+*Conjunction (And, Or)*+*[0 . . . 3] Action Clause*
Actions clauses may be constructed based on the syntax employed for action clauses in informational sentences. When the conditional and action clauses are combined the format will align to the following syntax:
Action Clause+Conjunction (And, Or)+[0 . . . 3] Action Clause Detail Sentence Format (by Parts of Speech and Catalog Elements)

Tool Catalog Element+Verb+Adjective (Numerical)+(Data or Material Catalog Element or Noun)+Preposition+Adjective (Numerical)+[1 . . . 5] (Data or Material Catalog Element or Noun)+Conjunction (And, Or)+[0 . . . 3] Action Clause Four examples using this format are presented below.
Example 1: Industrial Machine B utilizes Sub Machine 3 and Sub Machine 4.
Example 2: Material D is formatted in 16 inch disks.
Example 3: Industrial Machine B completes this in 10 minutes.
Example 4: Industrial Machine B completes this in 10 minutes and Industrial Machine B employs 30 Joules of energy.

Low-Level Automated Activity Smart Description

Unlike higher-level automated activity smart descriptions, low-level automated activity smart descriptions will not be separated into two types of sentences and may reference elements tagged in high-level automated activity smart descriptions. The low-level automated activity smart descriptions will be constructed with a similar but simplified syntax compared to higher-level automated activity smart descriptions. In an example, this simplified syntax may consist of one conditional clause and one action clause that is dependent on the conditional clause.
Low-level automated activity smart descriptions operate at the lowest level of detail because they do not have further children activities. If the system recognizes that two automated activities that employ a low-level automated activity smart description with one activity being the child of the other, the system will generate a smart signal that informs the user that low-level automated activity smart descriptions should only be employed at the lowest level of detail.
If the system recognizes that a high-level smart description is utilized at the lowest level of a model, the system will notify the user via a smart signal, that the activity may be further broken down at a lower level such that the activity can be described with low level automated activity smart descriptions.

Low-Level Automated Activity Smart Descriptions
(by Clause Type)

Conditional Clause+Action Clause
Conditional clauses will be generally constructed with the following syntax:

Conditional Clause Format (by Parts of Speech and Catalog Elements)

(Conjunction (If, While) or Preposition (On, For, Before, etc . . . ))+[1 . . . 5]((Noun or Catalog Element)+(Verb or Adjective)+(Adjective or Noun))
Three examples using this format are presented below.
Example 1: If Data Field 2 equals true and Data Field 3 equals false
Example 2: On Wednesday
Example 3: At 10 PM
Action clauses will be generally constructed with the following syntax:

Action Clause Format (by Parts of Speech and Catalog Elements)

Tool Catalog Element+Verb+Adjective (Numerical)+(Data or Material Catalog Element or Noun)+Preposition+Adjective (Numerical)+[1 . . . 5] (Data or Material Catalog Element or Noun)
Three examples using this format are presented below.
Example 1: Database A runs multiple system checks
Example 2: Tool C transforms wood into two pieces
Example 3: Industrial Machine B generates Material D from Material A
Conditional and Action clauses may be combined to form a sentence. Unlike higher-level automated activity smart descriptions, a low-level automated activity smart description can include only one action clause. When the conditional and action clauses are combined the format will align to the following syntax:

Low-Level Automated Activity Smart Descriptions
(by Clause Type)

Conditional Clause+Action Clause

Low-Level Automated Activity Smart Descriptions
(by Parts of Speech and Catalog Elements)

Figure 8:
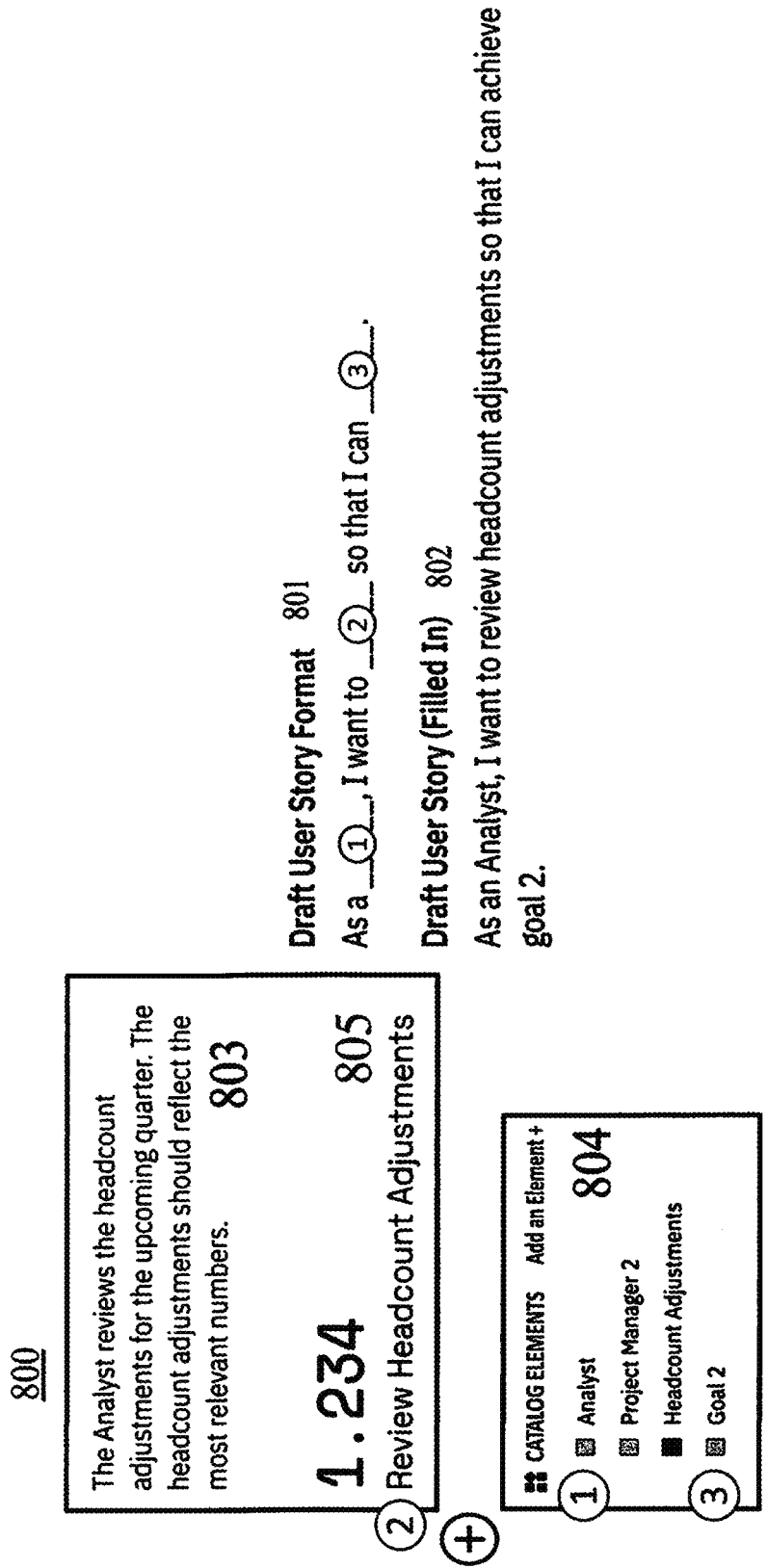
FIG. 8 is an illustration of a dynamic construction of draft user stories in events.

(Conjunction or Adjective or Preposition)+[1 . . . 5] ((Noun or Catalog Element)+(Verb or Adjective)+(Adjective or Noun))+Tool Catalog Element+Verb+Adjective (Numerical)+(Data or Material Catalog Element or Noun)+Preposition+Adjective (Numerical)+[1 . . . 5] (Data or Material Catalog Element or Noun) Two examples using this format are presented below.
Example 1: Every Monday, the computer program transforms data field 1 into data field 2.
Example 2: If data field 2 equals true and data field 3 equals false, the industrial machine separates material A into material B and material C.
FIG. 8 is an illustration 800 of a dynamic construction of draft user stories in events, in accordance with certain examples.

The process model application 112 may produce draft user stories specific to the work that occurs in different activities and events. Within the process model application 112, users will have the ability to view and edit the user stories automatically generated by the process model application 112 and, when appropriate, export those user stories out of the process model application 112.

A user story is a standard documentation method that describes a goal for a particular person, and how a future piece of work, such as software development, may accomplish that goal. User stories are often used in software development to break down work processes into smaller tasks that developers can work to produce. Developers may then test the software to verify that the software accomplishes the goals that have been set.

The process model application 112 provides additional value to the standard user story by indicating the exact moments in a work event that a goal must be accomplished, automatically establishing the relationships among user stories/functional requirements, and turning a manual and difficult task in the software development lifecycle into an automated activity.

Many draft user stories may be generated in the background based on an activity's smart description 803, short description 805, and the catalog elements 804 tagged to a specific activity. The illustration 800 depicts a smart description 803 of an activity 1.234. The activity 1.234 is to Review Headcount Adjustments. The smart description 803 and the short description 805 may be created as described with respect to at least FIG. 5. Some aspects of draft user stories are not automatically generated, such as the value statement, which could include reference to traits and characteristics or a user-generated value statement, such as a statement entered via a free text field.

Individuals can sort and filter draft user stories based on the activities and catalog elements, such as tool catalog elements, with which the user stories are associated. Typically, user stories will follow the following format 801 to ensure consistency and understanding across an organization:

As a [role/employee catalog element], I want to [an activity's short description] so that I can [list of relevant instructions, catalog elements, traits, characteristics, other activities, and user-generated value statements].

In certain examples, user stories will only be generated at the role and employee level. Because draft user stories will be generated at this level, the user stories will be actionable and not too large to be practicable. A draft user story can populate with only one role/employee catalog element. This catalog element will populate in the first blank in the draft user story template. If an activity contains more than one role/employee catalog element, multiple user stories will be generated for each of those catalog elements. For instance, if an activity tags three roles, that activity will result in three draft user stories being generated, one for each role. The user may have a preference between whether to generate an individual user story per each user with the same action, or to generate a user story that is applicable to multiple users.

In the example, two employee catalog elements are present. The elements are "analyst" and "project manager 2." Because each role/employee catalog element is associated with a single user story, the element "analyst" is inserted into the draft user story 802 in the first blank for this user story. "Project manager 2" would be associated with a second user story.

To populate the second blank in the draft user story template 801, an activity's short description 805 will be directly copied. For example, if an activity has a short description of "Review Headcount Adjustments" and an Analyst role catalog element is tagged to that activity, a corresponding draft user story 802 should read "As an analyst, I want to review headcount adjustments . . . ".

In addition, a draft user story will include a list of short "so that" statements. These statements will populate in the third blank in the draft user story template. These "so that" statements can concern the value related to the relevant instructions, catalog elements, traits, characteristics, other activities, and user-generated value statements.

For example, one "so that" statement could correspond with the production of a data catalog element. This production could occur when a data catalog element is tagged to an activity and noted as an output of that activity. In the illustration 800, the "so that" statement is pulled from the goal 2 in the catalog elements 804. The completed draft user story (filled in) 802 reads "As an analyst, I want to review headcount adjustments so that I can achieve goal 2."

Another example output may be "to produce Total Purchases data point." In an example, the draft user story would then read "As an analyst, I want to review the headcount adjustments so that I can produce the Total Personnel data point."

Additional "so that" statements can be added, for instance "As an analyst, I want to review the headcount adjustments so that I can produce the Total Personnel data point and experience a collaborative environment." This additional statement could be added if the activity has been noted as having the collaborative trait.

Other example "so that" statements could include "so that I can follow organizational rule 2.34," "so that I can grow professionally," "so that I can achieve our sales goal," or "so that I can complete activity 4.53."

When a user defines an instruction catalog element, the user will input whether the instruction should be "aimed to be followed," "strictly followed," "achieved," or any other suitable qualifier. Therefore, the section immediately following "so that I can_____" may be driven by what has been previously defined in the instruction catalog element.

Other example "so that" statements include:
Instruction-Based Auto-Generated "So That" Statements
so that I can aim to follow instruction catalog element
so that I can strictly follow instruction catalog element
so that I can achieve instruction catalog element
so that I can aim to achieve instruction catalog element
Human-Based User-Generated "So That" Statements
so that I can work with human catalog element
Data or Material-Based Auto-Generated "So That" Statements
so that I can produce the data or material catalog element
Place-Based User-Generated "So That" Statements
so that I can make use of the place catalog element
Traits and Characteristics-Based User-Generated "So That" Statements
so that I can experience a (n) trait or characteristic workplace
Other Activity-Based Auto-Generated (if no other "so that" statement can be auto-generated) "So That" Statements
so that I can complete succeeding activity's short description When appropriate, individuals can add a user-generated value statement via a free text field to complete a "so that" statement. For example, the process model application 112 may provide a user interface object that receives text entry from a user on an employee computing device 130. In another example, the process model application 112 provides a series of drop down menus or autofill suggestions to receive a selection from the user. The user may enter a text input to specify a "so that" result that is not obtainable from the smart description or the short description. For example, the user may have a non-intuitive reason to perform the task that is not obtainable by the process model application 112.

Individuals may have limited functionality in terms of editing draft user stories. This functionality will include the ability to update "so that" statements to reflect the most accurate representation of a user story, add additional user stories that may not be automatically generated, such as user stories that include trait and characteristic-based "so that" statements or user-generated value statements, or delete draft user stories. For example, the process model application 112 may create a user story that no longer reflects the reasons to perform a task. The user may edit the user story or delete the user story as needed.

If a tool is mentioned in an activity from which a user story is generated, the system will also link that user story to the mentioned tool. This link will allow traceability among the user story and related functional requirements if the user chooses to generate both.

Individuals will have the opportunity to export draft user stories out of process model application 112 and into other tools designed to specifically support the development process, such as Jira.

Figure 9A:
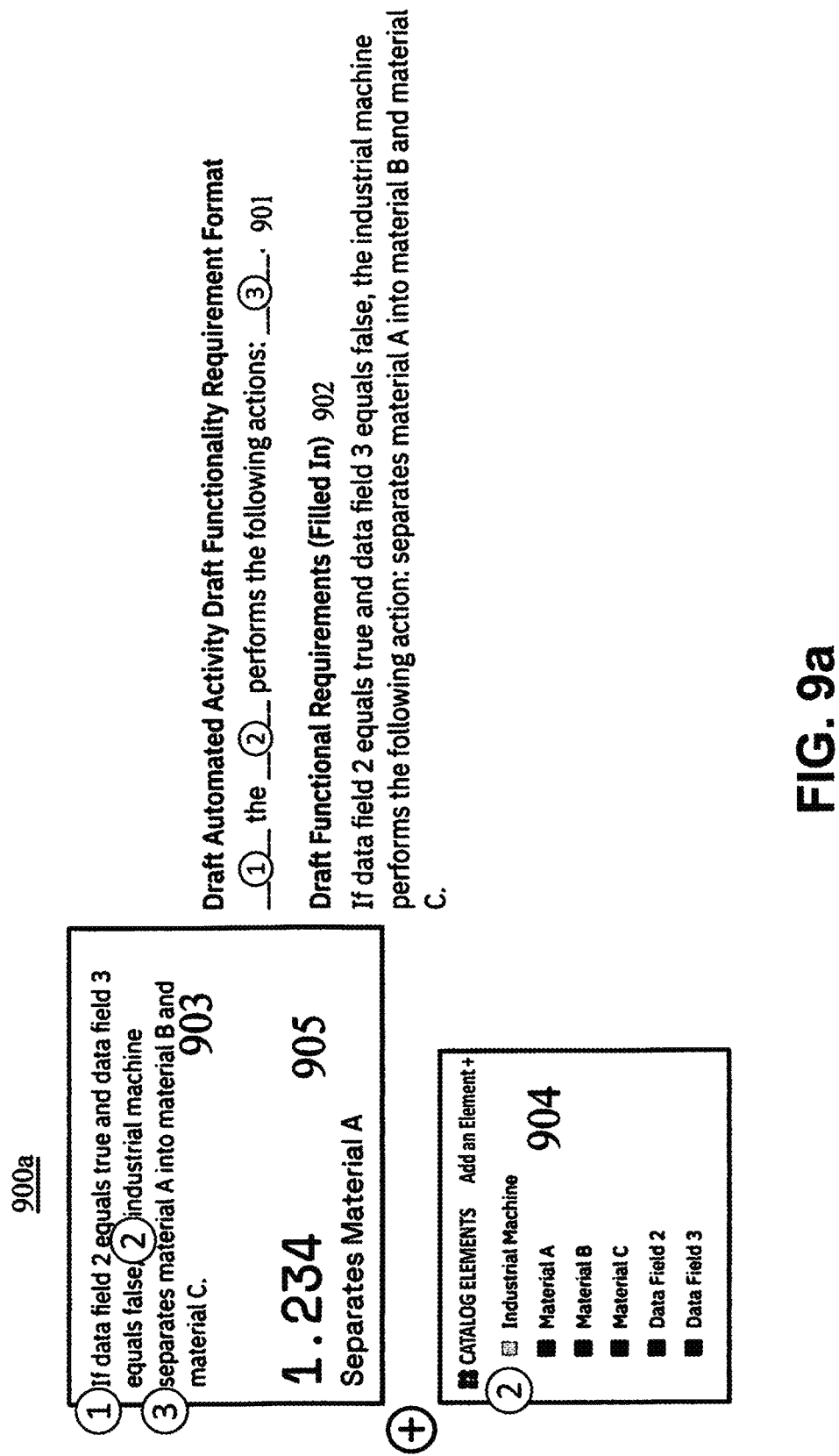
FIG. 9a is an illustration of a dynamic construction of draft functional requirements in events.

FIG. 9a is an illustration 900a of a dynamic construction of draft functional requirements in events, in accordance with certain examples.

The process model application 112 may produce draft functional requirements specific to the processes that occurs in different activities across various tools. Within the process model application 112, users will have the ability to view and edit the functional requirements automatically generated by the process model application 112 and, when appropriate, export those functional requirements out of the process model application 112.

A functional requirement is a statement that describes a function or behavior that a tool, data, or material element must be able to perform for individuals and teams to successfully navigate an activity or event.

The process model application 112 provides additional value to the standard functionality requirement by showing the exact moments in a work event that certain behaviors are required, automatically establishes the relationships among user stories/functional requirements, and turns a manual and difficult task in the software development lifecycle, or other work lifecycle, into an activity that is automated by the process model application 112.

The draft functional requirements may be generated in the background based on an activity's smart description 903, short description 905, the catalog elements tagged 904, inputs/outputs, and other attributes for that specific activity.

Draft functional requirements may be generated at the lowest possible level of activities and input/output associations. Because draft functional requirements are generated at this level, the user stories will be actionable and not too large to be practicable.

Users will have limited functionality in terms of editing draft functional requirements. This functionality will include the ability to delete draft functional requirements. At the same time, users will have the ability to sort and filter draft functional requirements based on the associated activities and catalog elements.

Users will also have the opportunity to export draft functional requirements out of the process model application 112 and into other tools designed to specifically support the development process, such as Jira.

The illustration 900a of FIG. 9a depicts a smart description 903 of an activity 1.234 and smart description 906 of an activity 1.123. The illustration 900a of FIG. 9a depicts a short description 905 of an activity 1.234 and short description 907 of an activity 1.123. The illustration 900a of FIG. 9a depicts catalog elements 904 of an activity 1.234 and catalog elements 908 of an activity 1.123. The smart descriptions and the short descriptions may be created as described with respect to at least FIG. 5.

Typically, functional requirements will follow the following formats 901 to ensure consistency and understanding across an organization.

Automated Activity Draft Functional Requirement

Automated activity draft functional requirements will focus on the actions performed by a tool within a certain activity.

Automated Activity Draft Functional Requirement Format

[Trigger] the [tool catalog element] performs the following actions: [system action]

To populate the first blank (Trigger) of an automated activity functional requirement 902, the process model application 112 will first identify that activity's smart description 903 and pull the conditional clause of the informational sentence if the smart description 903 is a higher-level automated activity smart description. For example, if the activity's smart description 903 is "On Tuesday, Database A runs multiple system checks," the process model application 112 will identify "on Tuesday" as the trigger for a functional requirement.

If the smart description 903 is a low-level automated activity smart description 903, the process model application 112 may also pull the conditional clause. For example, if the activity's smart description 903 is "If data field 2 equals true and data field 3 equals false, the industrial machine separates material A into material B and material C," the process model application 112 will identify "If data field 2 equals true and data field 3 equals false" as the trigger for a functional requirement 901.

The second blank (tool catalog element) of an automated activity functional requirement 902 will populate with one tool catalog element. If an automated activity contains more than one tool catalog element, multiple functionality requirements 901 may be generated each with one of those catalog elements. For example, if an activity tags three tools, that activity will result in three draft functionality requirements 901 being generated, one for each tool.

The third blank (system action) of an automated activity functional requirement 902 will populate based on the main clause of the automated activity's smart description 903. For example, if the smart description 903 reads "Every Monday, the computer program transforms data field 1 into data field 2," the system action blank will read "transforms data field 1 into data field 2."

In the example from illustration 900, the draft functional requirements (filled in) 902 would read "If data field 2 equals true and data field 3 equals false, the industrial machine performs the following action: separates material A into material B and material C" based on the data extracted from the smart description 903 and the short description 905.

Automated Decision Activity Draft Functional Requirement Format

Automated decision activity draft functional requirements 912 will behave somewhat similar to that of an automated action activity draft functional requirement 901, but with a focus on the possible alternative pathways/decisions being made within that activity.

Automated Decision Activity Draft Functional Requirement Format

Trigger tool catalog element determines whether to [1 . . . 4] outcome based on the following logic:
[1 . . . 6] If [datapoint] is [condition] or [condition] then [outcome].

Figure 9B:
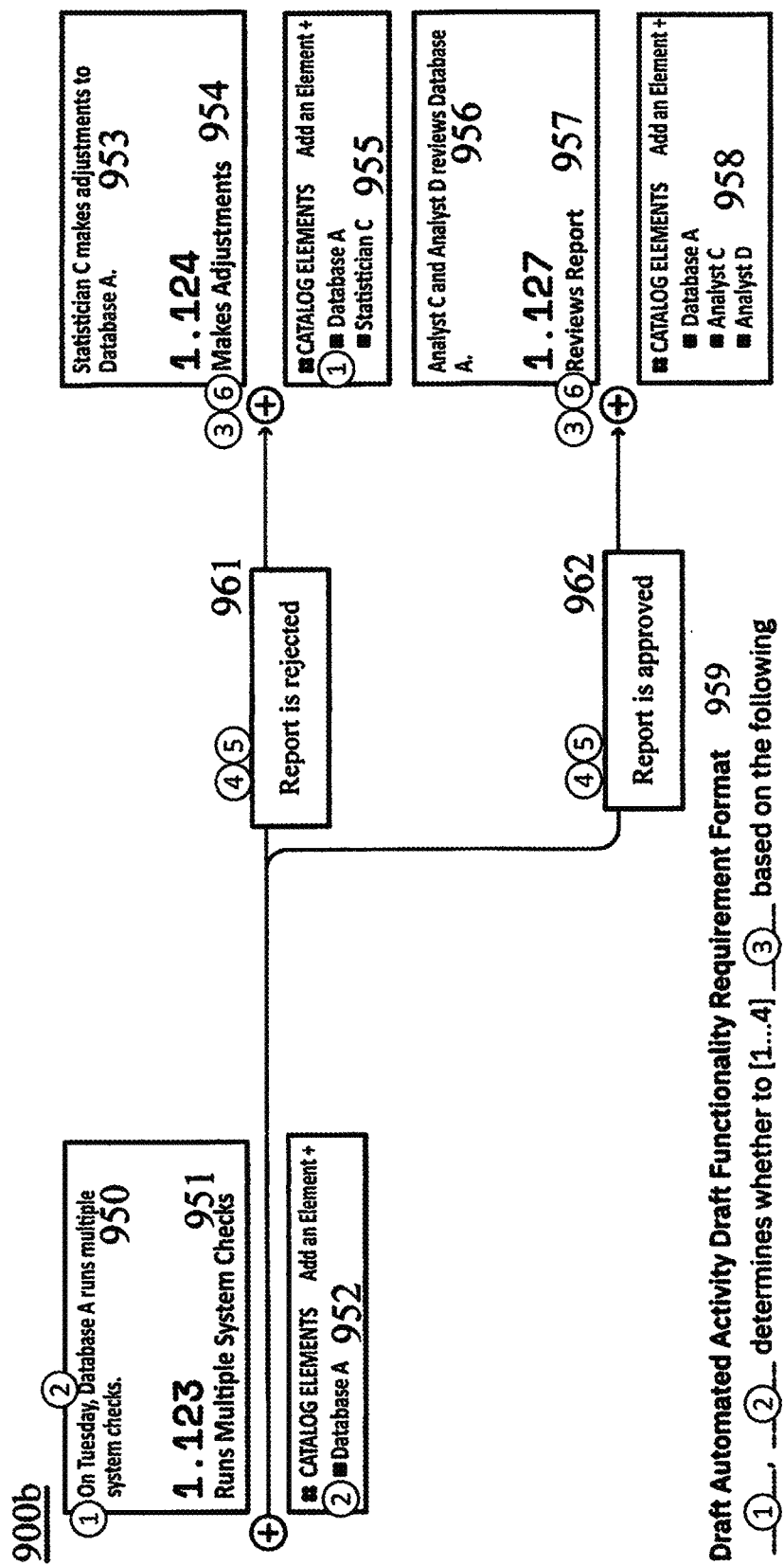
FIG. 9b is an illustration of a dynamic construction of draft functional requirements in events with alternative results.

FIG. 9b is an illustration 900b of a dynamic construction of draft functional requirements in events with alternative results, in accordance with certain examples.

Similar to an automated activity draft functional requirement, the first blank (Trigger) of the draft functionality requirement 959 of an automated decision activity functional requirement will be pulled from that resulting activity's smart description 950, specifically the conditional clause of the informational sentence if the smart description 950 is a higher-level automated activity smart description 950. For instance, if the activity's smart description 950 is "On Tuesday, Database A runs multiple system checks," the system will identify "on Tuesday" as the trigger for a functional requirement.

If the smart description 950 is a low-level automated decision activity smart description 950, the process model application 112 will also pull the conditional clause. For example, if the activity's smart description 950 is "If data field 2 equals true and data field 3 equals false, the industrial machine separates material A into material B and material C," the process model application 112 will identify "If data field 2 equals true and data field 3 equals false" as the trigger for a functional requirement.

If the process model application 112 does not find a conditional statement with an activity's smart description 950, the process model application 112 will extract the action clause from the previous activity's smart description. For example, if the activity that precedes an automated action activity has a smart description of "The BUF/RFP makes headcount adjustments by pay grade," the trigger blank would read "When the BUF/RFP makes headcount adjustments."

The second blank (tool catalog element) of the draft functionality requirement 959 will populate with one tool catalog element 952. If an automated activity contains more than one tool catalog element 952, multiple functionality requirements will be generated for each of those catalog elements 952. For example, if an activity tags three tools, that activity will result in three draft functionality requirements being generated, one for each tool.

The third set of blanks (outcome) of the draft functionality requirement 959 will populate based on the short descriptions 954 and 957 of the activities that follow the decision activity. The number of these blanks will be determined by the number of activities that follow the relevant automated decision activity.

The set of if statements will populate based on the sequence mark descriptions 961 and 962 coming out of the automated decision activity that is of interest and from succeeding activity short descriptions, which are activities connected to the automated decision activity that is of interest through sequence marks. The process model application 112 does this by pulling the action clause from their informational sentence. The sequence mark descriptions will populate the datapoint and condition blanks, while the action clause will populate in the outcome blank.

The illustration 900b of FIG. 9b depicts a smart description 950 of an activity 1.123 and a short description 951 of an activity 1. The illustration 900b of FIG. 9 depicts catalog elements 952 of an activity 1.123. The smart descriptions and the short descriptions may be created as described with respect to at least FIG. 5.

In an example, an automated decision activity has a smart description of "On Tuesday, Database A runs multiple system checks," and the two succeeding activities have short descriptions of "Review Report" and "Makes Adjustments" with their own respective sequence mark descriptions. The functional requirement generated could read:

On Tuesday, Database A determines whether to make adjustments or review report based on the following logic:
  If the report is rejected, then make adjustments
  If the report is approved, then review report.

Input/Output Association—Input Specific Draft Functional Requirement

Figure 9C:
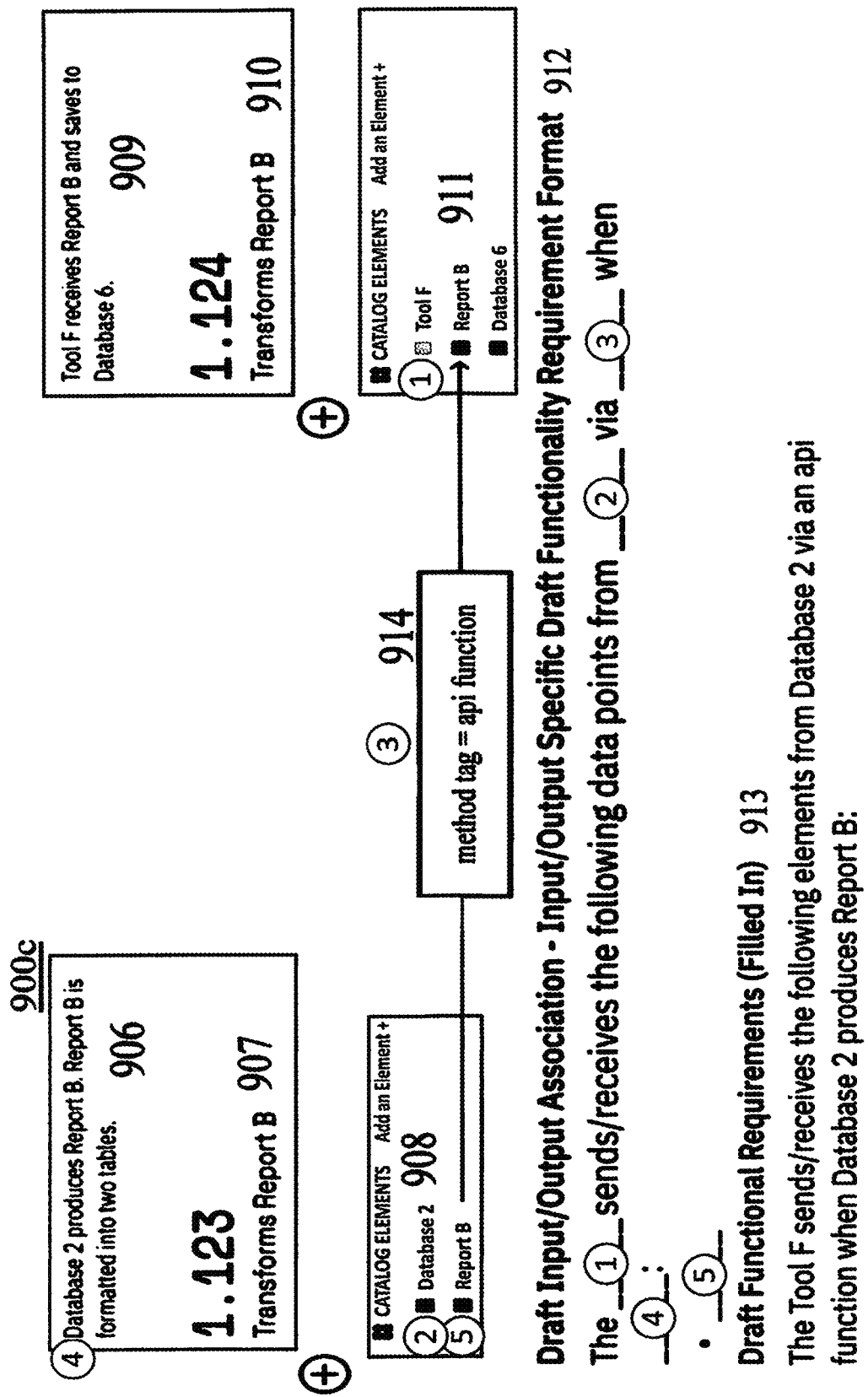
FIG. 9c is an illustration of a dynamic construction of input/output specific draft functionality requirements in events with alternative results.

FIG. 9c is an illustration of a dynamic construction of input/output specific draft functionality requirements in events with alternative results.

The illustration 900c of FIG. 9c depicts a smart description 906 of an activity 1.123 and a short description 907 of an activity 1. The illustration 900c of FIG. 9c depicts catalog elements 908 of an activity 1.123. The smart descriptions and the short descriptions may be created as described with respect to at least FIG. 5.

Input specific functional requirements will focus on the inputs associated with a certain activity.

Input/Output Association—Input Specific Draft Functional Requirement Format

The [tool 1 catalog element] sends the following elements to [tool 2 catalog element] via [transfer method] when [trigger]:
  [data catalog element]
  [data catalog element]

To populate the first two blanks (tool catalog element) of an input specific draft functional requirement, the process model application 112 will review the input/output associations associated with an activity and determine the parent tool or parent data/material catalog elements 908 of the data or material catalog element involved in the input and output association. The parent catalog element 908 associated with the activity from which the data or material catalog element will come will populate in the first blank, while the tool catalog element 911 associated with the activity where the data or material catalog element 908 is transferred will populate in the second blank.

The third blank (transfer method will populate with the input/output association method tag 914 associated with the relevant input/output association.

The fourth blank (trigger will populate based on the action clause of the smart description 906 associated with the activity that the input and output association originated from.

The rest of the blanks (data catalog element will populate based on the data or material catalog elements 908 and 911 associated with the two activities already populated in the functional requirement and the relevant input/output association.

Input/Output Association—Output Specific Functional Requirement

Input/output association-output specific functional requirements will focus on the outputs associated with a certain activity.

Input/Output Association—Output Specific Functional Requirement Format

The [tool catalog element 1] receives the following elements from [tool catalog element 2] via [transfer method] when [trigger]:
  [data catalog element]
  [data catalog element]

To populate the first two blanks (tool catalog element) of an input specific draft functional requirement, the system will review the input/output associations associated with an activity and determine the parent tool or parent data/material catalog elements 908 of the data or material catalog element involved in the input and output association. The parent catalog element 911 associated with the activity to which the data or material catalog element proceeds will populate in the first blank, while the tool catalog element 908 associated with the activity from which the data or material catalog element came will populate in the second blank.

The third blank (transfer method) will populate with the input/output association method tag 914 associated with the relevant input/output association.

The fourth blank (trigger) will populate based on the action clause of the smart description 906 associated with the activity from which the input and output association originated.

The rest of the blanks (data catalog element will populate based on the data or material catalog elements 908 associated with the two activities already populated in the functional requirement and the relevant input/output association.

Connection to User Stories

If user stories are created and tagged to the same tool for which a functional requirement has been created, the process model application 112 will establish a relationship between the functional requirement and the user story. This relationship will allow a developer to understand the full scope of front-end and back-end requirements needed for a tool to support a specific activity and may allow development activities to be organized in a more efficient manner. These relationships are currently established manually, however the process model application 112 will allow this manual activity to be automated.

Scope Definition Statement

The scope definition statement is a system-generated introduction to the table of functional requirements. The purpose of this statement is to succinctly summarize what is covered by the functional requirements (what tools the requirements are for and what human events they support) that may be exported into another tool and further edited or used for development purposes.

The scope definition will outline the relevant tools, relevant functions/events/activities, and relevant user types.

The list of relevant tools will initially be generated by the system and refined by a user to determine what tools will be contained in the set of functional requirements.

The list of relevant functions/events/activities will be generated by including the function/event/activity that were selected by a user to receive draft functional requirements as well as each nested function/event/activity to the lowest level of granularity provided in the enterprise hierarchy. A user may manually refine which children functions/events/activities are included. For example, a user may manually add to or delete items that are included on the list.

Additionally, the process model application 112 will generate a list of integrations among the tools in scope and other tools applied to the selected portion of the enterprise hierarchy that are linked through inputs and outputs. Within the scope definition, the process model application 112 will also extract the catalog elements within the human category that are noted as interacting with the tools in scope to create a list of end users. This scope definition is intended to summarize and allow a user to modify the contents of the functional requirements quickly.

Permissions and Security Matrix

The process model application 112 will generate a draft permissions/security matrix outlining the possible actions taken by users within the scoped tools by all of the human catalog elements that are described as performing those actions. Actions headers may be pulled from the action clauses in the smart descriptions.

A security matrix, such as in the example Table 2, is a standard software development artifact that outlines the users of a particular tool on one axis and the functions that users may perform using the tool on another axis. The matrix formed by these two axes notes whether or not a particular user will have access to perform a particular function. The purpose of this security matrix is to provide the data needed to configure system specific user roles, permissions, and security.

TABLE 2

|  | Action 1 | Action 2 | Action 3 |
|---|---|---|---|
| Role 1 | x |  | x |
| Role 2 |  | x |  |
| Role 3 | x |  | x |
| Role 4 | x |  | x |

The process model application 112 provides additional value to this standard business product by allowing users to manipulate the data within a security matrix using other organizational structures native to the process model application 112 environment. For example, a user may filter/sort/edit the functions axis of a security matrix by the level of the enterprise hierarchy. In another example, a user may filter/sort/edit the user axis of the security matrix by the hierarchy established in the catalog. Any other suitable arrangement of the security matrix may be created by a user or by the process model application 112.

Tools and Data/Material Access Matrix
(Data/Material Integrations)

The process model application 112 will generate a draft matrix outlining the different data and material catalog elements that a tool needs to access/edit within a part of an enterprise. Row and column headers will represent either tools or data/material catalog elements.

Rules and Regulations List

The process model application 112 may generate a summary list of the instruction catalog elements that are applied to the portion of the enterprise hierarchy defined within the scope. The process model application 112 will note the pervasiveness of the instruction catalog elements throughout different functions/events/activities such that a user can begin to define a ruleset for design and development of a new tool.

Users will have the ability to filter and sort instruction catalog elements, functions, events, and activities by the elements that are most relevant to them.

Dynamic Creation of Spreadsheet-Based Flows

The process model application 112 may produce spreadsheet-based flows specific to the work that occurs in different activities. Users will have the ability to view spreadsheet-based flows automatically generated by the process model application 112 and, when appropriate, export those spreadsheet-based flows out of the process model application 112.

The spreadsheet-based flows will be generated in the background based on an activity's smart description and the attributes associated with that specific activity.

In certain examples, spreadsheet-based flows will be formatted as the tabular equivalent of an event or activity in the process model application 112. Rows will represent different activities and columns will represent the different attributes associated with each of those activities.

For example, if an event contains ten activities, the spreadsheet-based flow for that event would contain ten rows, one for each activity. Each of those rows would contain one or more columns representing each activity's attributes. In examples, the columns are dedicated to one or more of the activity's type tags, tagged material catalog elements, duration, and other attributes.

In certain examples, users will not have an ability to edit a spreadsheet-based flow directly. Instead, users will have to edit activities within the process model application 112 and have a new spreadsheet generated.

Users will have the opportunity to export spreadsheet-based flows out of the process model application 112 and into several different formats, such as PDF, CSV, or other suitable format.

By providing this functionality, users and teams will be able to address organization requirements if an organization requires work to be in a specific format. Users and teams will be able to address individual preferences if certain individuals prefer to consume information in a certain format.

Dynamic Creation of Business Process Flows

The process model application 112 will produce business process flows specific to the work that occurs in different events and the activities that make up those events. Individuals will have the ability to view business process flows automatically generated by the process model application 112 and, when appropriate, export those business process flows out of the process model application 112. These flows will employ visual depictions and notations accepted and employed across numerous industries.

The business process flows will be generated in the background based on an activity's short description and the sequence marks associated with those specific activities. Business process flows will be formatted as the business process modeling notation (BPMN) equivalent of an event in the process model application 112.

For example, activities will be visualized as either rectangles, diamonds, or any other organization specific documentation standards based on their type tag. In addition, the activity's short description will be visible and tied to that rectangle or diamond. Sequence marks and the contextualization of those marks will also appear based on the relationship between those activities.

In an example, if a process model application 112 had an event comprised of five activities, this event and the activities that comprise it would be transformed to a process flow diagram that employs BPMN to depict the five activities. The process model application 112 diagram may depict whether the event and activities were associated with an action or decision. The process model application 112 diagram may depict whether the connections between those activities (based on the event's sequence marks).

In certain examples, users will not have an ability to edit a business process flow directly. Instead, users will have to edit the activity itself within process model application 112.

Individuals will have the opportunity to export business process flows out of process model application 112 and into several different formats (ex: PDF, etc . . . ).

By providing this functionality, individuals and teams will be able to address organization requirements (if an organization requires work to be in a specific format) and individual preferences (if certain individuals are predisposed to consuming information in a certain format).

Figure 10:
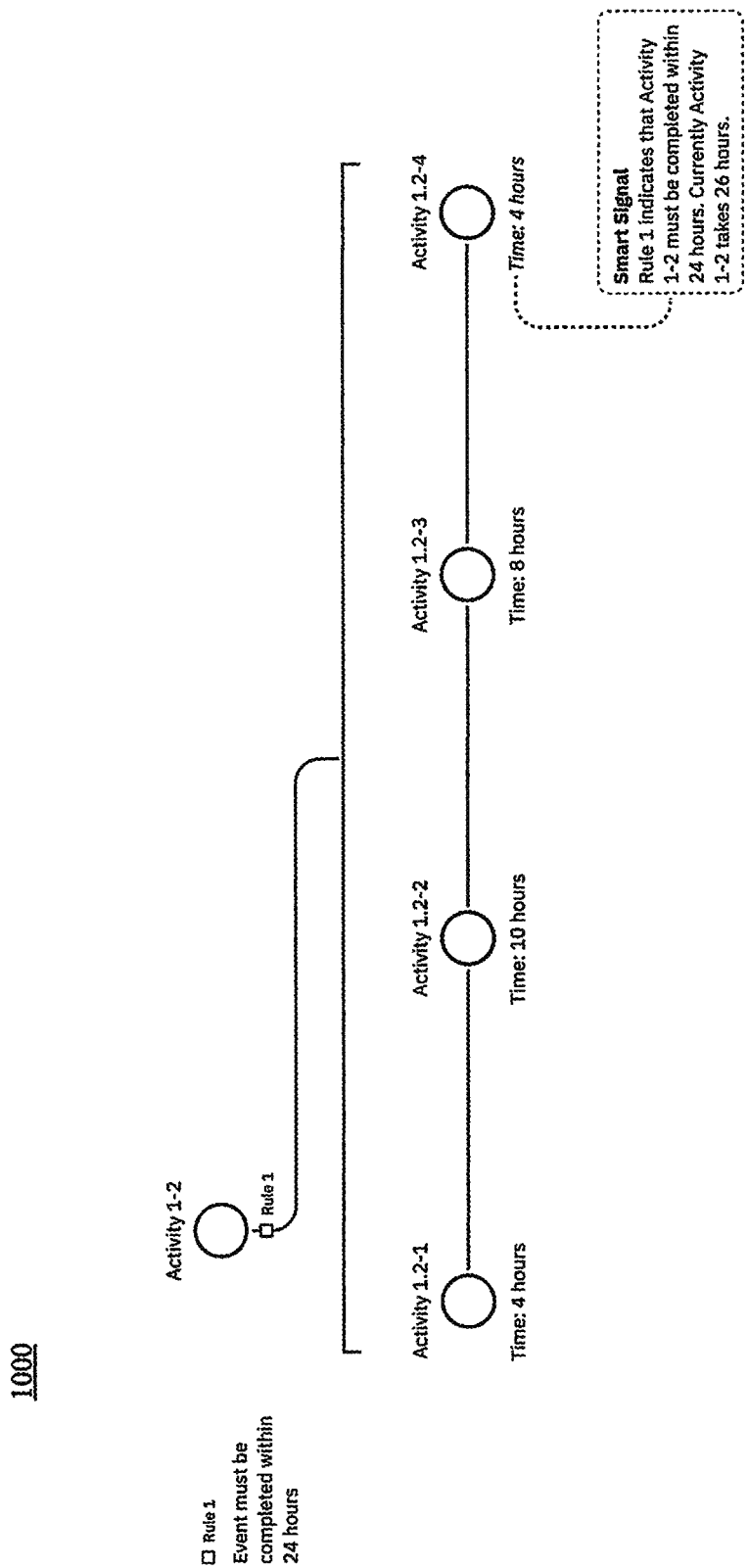
FIG. 10 is an illustration of customizable, policy-driven logic that governs how activities are designed and catalog elements are employed.

FIG. 10 is an illustration of customizable, policy-driven logic that governs how activities are designed and catalog elements are employed.

System administrators of the work model application 112 will have the ability to enter any policy related restrictions to operations by employing instructions from the "Instructions" section of the catalog 113 and apply them at various levels of the enterprise. For example, the time requirement may be based on a government regulation or other rule. In another example, the tag may require a certain person with a certain training certificate be used to perform one or more of the activities of the event.

If a user were to create an event or activity that violated any of these instructions, the user would be alerted that the process is out of compliance with company policy. Depending on the level of restriction entered by the system administrators, a designer with an event that is out of compliance, may be restricted from publishing the model.

A restriction may be set by employing instructions that include the ability to limit which catalog elements are allowed to be used in the same events. For example, an organization can limit the number of people involved in one activity. If that restriction has been set, and an activity goes above that limit, individuals viewing that activity will receive a system-generated notification or other restriction or notification (smart signal). Other restrictions include the ability to require certain catalog elements to be employed within an event, a requirement that a particular location be tagged, a requirement on the amount of time a certain event could take, or any other suitable requirement.

In FIG. 10, the user interface 1000 illustrates an Activity 1.2 that has a Rule 1 that the activity must be completed in 24 hours. For example, the rule may exist because a raw material may experience spoilage after 24 hours. In the illustration, Activity 1.2-1, Activity 1.2-2, Activity 1.2-3, and Activity 1.2-4 must occur for the Activity 1.2 to be completed. However, the times required to perform each of the child activities totals to 26 hours. The 26 required hours violate the Rule 1. A smart signal or other notification either notifies the user or a system administrator, or the Activity 1.2 is disabled until corrections are made.

The work model application 112 provides translation of process flows and work models into meaningful, actionable modeling insights and suggestions. The insights and suggestions may be represented as smart signals.

The work model application 112 system generates smart signals when it has identified opportunities or challenges specific to how models/flows or activities have been designed and catalog elements have been deployed. Further, the smart signals may be influenced with regards to their attributes, types/traits/qualities, and characteristics. To identify flow conflicts or opportunities, the work model application 112 reviews the various attributes of different enterprises, models/flows, activities, catalog elements, attributes, and reactions from an individual perspective.

When a user receives a smart signal, the smart signal will specify the date and time it was generated, a description of why the signal was generated, and a reference to the piece of content that caused the smart signal to be generated.

Table 2 below provides examples of smart signals. The table includes the smart signal name, a context of the smart signal, a description, and a possible suggestion for a response to the smart signal.

TABLE 2

| Smart Signal Name | Smart Signal Context | Smart Signal Description | Possible System Suggestion |
|---|---|---|---|
| # of Activities | Model/Flow | If the # of activities in a model/flow is an outlier (many more or many fewer) than other models/flows | Should the model/flow be broken down into multiple models/flow or be combined with other models/flow? |
| # of Variants | Model/Flow | If the # of variants a model has is an outlier (many more or many fewer) than other models/flows | Why does this model/flow have so many variants? Is something not clear? Could something be clarified? |
| Length of Smart Description | Activity | If an activity has a smart description that has a length that is an outlier (much longer or much shorter) | Can you add more clarity to the activity? Should the activity be broken down into other activities? |
| # of Sequence Marks | Activity | If an activity has an outlier number of sequence marks (many more or many fewer) than other activities | Why does this activity have so many more or fewer sequence marks than other activities in the same model? Can you add additional activities or remove activities to improve the process? |

TABLE 2-continued

| Smart Signal Name | Smart Signal Context | Smart Signal Description | Possible System Suggestion |
|---|---|---|---|
| Outlier Based on Characteristics | Activity | If an activity has a distinctly different set of characteristics compared to other activities. | Why does this have such a different set of characteristics? Are these characteristics warranted? Could the event be better if it was more similar to other activities? |
| # of Empty Attributes | Catalog Elements | If a catalog element has barely been touched in comparison to other catalog elements | Why does this catalog element have so many more empty attributes than other catalog elements? Can you tag someone to complete this catalog element? |
| # of Children Elements | Catalog Elements | If a catalog element has an outlier # of children elements (many more or many fewer) than other catalog elements | Why does this catalog element have so many more or fewer children elements than other catalog elements? Can you add additional or remove children elements to improve the process? |
| Trait Alignment | Catalog Elements | If a detail associated with a catalog element and trait does not align with responses to the different traits associated with an activity. | Why does this individual have this large amount of responsibilities in this activity when they do not have the correct traits for that activity? |
| # of Reactions Assigned to an Individual | Reactions | If a reaction has an outlier # of reactions (many more or many fewer) than other reactions | Why does this reaction have so many more or fewer reactions than other reactions? |
| Sentiment | Reactions | If the attributes associated with a reaction have a sentiment that is an outlier | Why is the sentiment associated with this reaction so different from the sentiment associated with other reactions? |
| Amount of Time | Input/ Output Associations | If an input/output association takes an amount of time that is an outlier (much longer or shorter) compared to other input/output associations | Why is the time it takes for this input/output association so much different than the time it takes for other input/output associations? |
| # of Associations | Input/ Output Associations | If an input or output has an outlier # of associations (many more or many fewer) than other inputs and outputs. | Why does this input/output association have so many more or fewer associations than other input/output associations? |
| Amount of Time | Sequence Marks | If a sequence mark takes an amount of time that is an outlier (much longer or shorter) compared to other sequence marks | Why is the time it takes for this sequence mark so much different than the time it takes for other sequence marks? |

Figure 11:
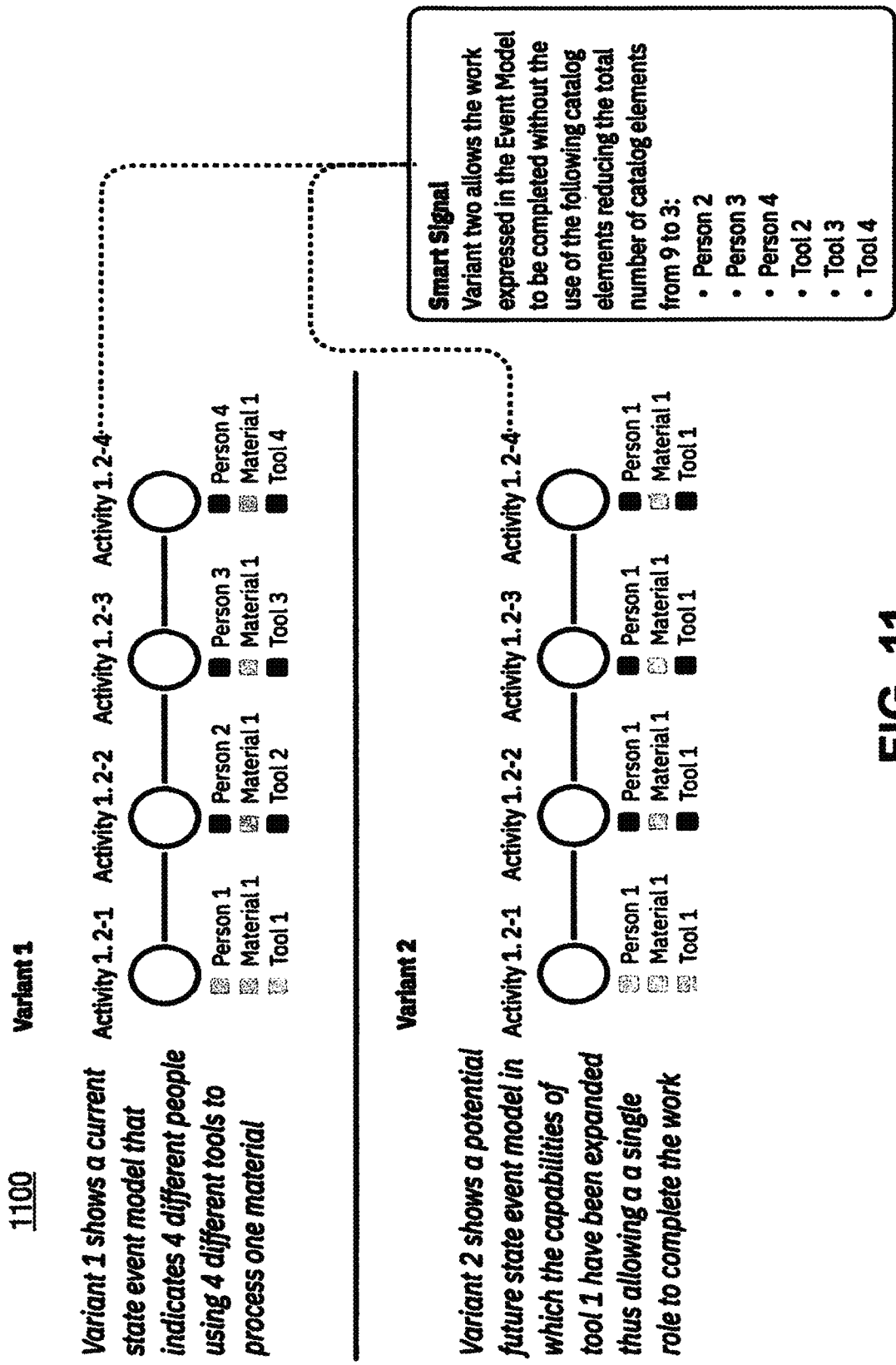
FIG. 11 is an illustration of a translation of variant events into insights detailing the delta/similarities among multiple models.

FIG. 11 illustrates a translation of variant events into insights detailing the differences and similarities among multiple models. This process serves to compare and resolve smart signals, compare the current state to future state, compare variants of the same event in different places (such as, North America vs South America), and evaluate the effect of a change within a model on other attributes/activities.

When comparing two events, the system compares the data models of both variants to identify and present to the viewer information such as the following: 1) Which catalog elements are utilized across both events; 2) Which activities are identical; 3) Where the characteristics of activities may differ; 4) Where reactions from the workforce may differ in regards to the two events; 5) Where do variations in catalog elements drive variations in cost/time; 6) Overall cost and time for the two variants; and 7) any other suitable data from the two events.

This functionality allows users to analyze two different possibilities for a new operation or compare two similar existing events. The comparison may allow a user to identify why one activity might be performing better than another activity. Viewing work in this way allows users to identify redundant or repeated activities and explore activities that could potentially be consolidated, reducing unnecessary complexity within the operations.

In FIG. 11, the user interface 1100 illustrates two variant series of events. In Variant 1, Activity 1.2-1, Activity 1.2-2, Activity 1.2-3, and Activity 1.2-4 indicate that 4 different people using 4 different tools are required to perform the series of activities. Each event in the series has a different person using a different tool. Variant 2 illustrates Activity 1.2-1, Activity 1.2-2, Activity 1.2-3, and Activity 1.2-4 with a single person using a single tool to perform the series of activities. Persons 2, 3, and 4 and tools 2, 3, and 4 are not required by Variant 2. The savings in personnel time and tool usage time is realized in Variant 2. When the work model application 112 compares the two variants, the work model application 112 is able to identify the reduction in persons and tools required. The work model application 112 reports the difference to the user via a smart signal so that the user may elect which variant to use.

The work model application 112 may further use this system to allow a user to design multiple processes to perform an event or a complete work model. For example, the user may create structures with multiple alternative work models that lead to a desired conclusion. By comparing the multiple work models, the work model application 112 determines the number of resources required to perform each activity in the work models. The work model application 112 compares the resources required and identifies the work model that uses a smaller number of one or more of the resources. The work model application 112 is able to suggest to the user a preferred work model to conserve costs, manpower, raw materials, tool usage, or other resources.

Figure 12:
FIG. 12 is an illustration of interjections as a form of reacting to events and elements.

FIG. 12 illustrates interjections as a form of reacting to events and elements. Reactions are a set of exclamations or interjections that users can employ reactions to respond to an event, activity, or catalog element in the context of an activity on a structure or other embodiment of the work model application 112. The reactions may be words or expressions that convey a spontaneous feeling or reaction.

Reactions are organized into two groups-those that are related to the work itself and those that are related to the modeling of that work. Reactions related to the actualities of the work may include, but are not limited to: Great!, Satisfactory, Frustrating or any other suitable reactive or responsive word. Reactions related to the representation of work in the work model may include, but are not limited to: Woah, Yep, Wrong, or any other suitable reactive or responsive word.

When a user reacts to an event, the user is prompted to identify if any catalog elements tagged to the event affect the reaction. Additionally, the individual will be asked to contextualize the reaction to explain why they have reacted to the event or catalog element.

In FIG. 12, a user interface 1200 is displayed with an Activity 1.2.3-7. The Activity 1.2.3-7 has displayed a smart description and an object field that displays Review headcount Adjustments. The user interface 1200 displays an interface object 1201 with an option to provide reactions to the Activity 1.2.3-7. The options displayed are Wow, Huh, and Eureka. The options displayed may be based on past reactions provided by the user, reactions by other users, reactions based on the content of the event, or based on any other suitable history or usage. The interface object 1201 displays an option to Add a Reaction by clicking on the Plus sign. Clicking on this link or object may provide a dropdown list or popup menu of other reactions that the user may select. Alternatively, the interface object 1201 may provide an option to enter a new reaction word that is not on the stored list.

After receiving the reaction, the user interface 1200 may provide an option for the user to associate the reaction with a specific catalog element of the Activity 1.2.3-7. An interface object 1202 may display one or more catalog elements that are already associated with the Activity 1.2.3-7 or may be associated with the Activity 1.2.3-7. The reaction may be specific to only one catalog element and not the entire activity. For example, a user may react Eureka to the fact that a catalog element related to a particular raw material is associated with the Activity 1.2.3-7. The user may react because the raw material is new to the activity, and the new raw material corrects a previous deficiency in the activity. The user is reacting to the designation of the new raw material for an existing Activity 1.2.3-7.

The user interface 1200 may subsequently provide an additional interface object that allows a user to type a reason for the reaction. For example, a popup window provides a text entry option to a user to type in the reason that the user has reacted. In the example above, the user may enter text to clarify that the Eureka was provided because "I am very excited about the usage of the new raw material. This material will solve a long-standing issue with this event."

Example Systems

FIG. 13 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system for automatically determining whether a first process element supports a second process element in a hierarchical process flows, comprising:
   a processor communicatively coupled to a storage device, wherein the processor executes application code instructions that are stored in the storage device to cause the system to:
     receive an entry of one or more sets of traits for each of the first process element and the at least the second process element, wherein each of the one or more sets of traits for the first process element and the at least the second process element include a plurality of individual traits, wherein each individual trait of the plurality of individual traits is representative of a qualitative aspect or a human aspect of the first process element and the at least the second process element, and wherein each of the one or more sets of traits for each of the first process element and the at least the second process elements are not computationally comparable;
     determine an effect of each individual trait of the plurality of traits on a characteristic of the first process element and the at least the second process element based on a predetermined algorithmic relationship retrieved from the storage device;
     separately compute one or more metrics for each of the first process element and the at least the second process element based on (i) the obtained one or more traits for the at least first and second process elements; and (ii) the determined effect of each individual trait of the plurality of traits, wherein the separately computed one or more metrics for each of the first process element and the at least the second process element comprise computationally comparable profiles of the qualitative and/or human aspects of the first process element and the at least the second process element; and
     based on the separately computed one or more metrics for each of the first process element and the at least the second process element, automatically determine whether the first process element supports the at least the second process element.

2. The system of claim 1, wherein the entry of the one or more sets of traits are received from one or more users performing one of the first process element or the at least the second process element.

3. The system of claim 1, wherein the first process element is an activity; and wherein the at least the second process element is a resource utilized by the process.

4. The system of claim 3, wherein the resource is one of a tool or personnel.

5. The system of claim 1, further comprising receiving an entry of one or more sets of traits for a third process element; and computing one or more metrics for the third process element.

6. The system of claim 1, wherein the one or more metrics for each of the first process element and the at least the second process element are continuously computed as the received one or more sets of traits for each of the first process element and the at least the second process element are received or modified.

7. The system of claim 6, wherein the system repeatedly automatically determines whether the first process element supports the at least the second process element based on the continuously computed one or more metrics for each of the first process element and the at least the second process element.

8. The system of claim 1, wherein the received entry of the one or more traits are derived from (i) metadata associated with at least one of the first process element or the at least the second process element, where the at least one of the first process element or the at least the second process element is an automated process element, and/or (ii) a machine learning process.

9. A computer-implemented method of selecting one or more resources for at least one process element, comprising:
   a. obtaining (i) one or more sets of traits for each of the one or more resources, and (ii) one or more sets of traits for the at least one process element, wherein each of the one or more sets of traits for the one or more resources and for the at least one process element includes a plurality of individual traits derived from an operator, wherein each individual trait of the plurality of individual traits is representative of a qualitative aspect or a human aspect of one of the one or more resources or the at least one process element, and wherein each of the one or more sets of traits for each of the one or more resources or the at least one process element are not computationally comparable;
   b. separately computing one or more characteristics for each of the one or more resources or the at least one process element based at least on the obtained one or more traits for the one or more resources or the at least one process element, wherein the separately computed one or more characteristics for each of the one or more resources or the at least one process element comprise computationally comparable profiles of the qualitative and/or human aspects of the at least first and second process elements;
   c. based on the separately computed one or more characteristics for each of the one or more resources or the at least one process element, automatically determining which of the one or more resources supports the at least one process element; and
   d. selecting at least one resource of the one or more resources that supports the at least one process element.

10. The method of claim 9, wherein the at least one process element is an activity.

11. The method of claim 9, wherein the one or more resources comprise tools or personnel.

12. The method of claim 9, wherein the one or more characteristics are separately computed based on one or more algorithmic relationships.

13. The method of claim 9, wherein the at least one process element comprises at least two process elements, and wherein the method comprises computing one or more characteristics for each of the at least two process elements.

14. The method of claim 13, wherein the one or more resources comprise two or more resources, and wherein at least a first of the two or more resources is selected for a first of the at least two process elements.

15. A non-transitory computer-readable medium for determining whether a first process element supports at least a second process element, comprising instructions stored thereon, that when executed on a processor, perform the steps of:
- receive an entry of one or more initial sets of traits for each of the first process element and the at least the second process element, wherein each of the one or more initial sets of traits for the first process element and the at least the second process element include a plurality of individual traits, wherein each individual trait of the plurality of individual traits is representative of a qualitative aspect or a human aspect of the first process element and the at least the second process element, and wherein each of the one or more sets of traits for each of the first process element and the at least the second process elements are not computationally comparable;
- separately compute one or more initial characteristics for each of the first process element and the at least the second process element based on the obtained one or more traits for the at least first and second process elements, wherein the separately computed one or more initial characteristics for each of the first process element and the at least the second process element comprise computationally comparable profiles of the qualitative and/or human aspects of the first process element and the at least the second process element;
- based on the separately computed one or more initial characteristics for each of the first process element and the at least the second process element, automatically determine whether the first process element supports the at least the second process element; and
- continuously monitor whether the first process element and the at least the second process element support each other based on continuously received entries of one or more supplemental sets of traits for at least one of the first process element and the at least the second process element.

16. The non-transitory computer-readable medium of claim 15, wherein the continuously monitoring comprises computing one or more supplemental sets of characteristics for the at least one of the first process element or the at least the second process element based on the continuously received entries of the one or more supplemental sets of traits for the at least one of the first process element or the at least the second process element.

17. The non-transitory computer-readable medium of claim 16, further comprising repetitively automatically comparing the computed one or more supplemental sets of characteristics and the one or more initial characteristics.

18. The non-transitory computer-readable medium of claim 15, wherein one of the first process element or the at least the second process element is an activity.

19. The non-transitory computer-readable medium of claim 15, wherein one of the first process element or the at least the second process element is a resource.

20. The non-transitory computer-readable medium of claim 19, wherein the resource is selected from the group consisting of a tool or personnel.

21. The non-transitory computer-readable medium of claim 15, wherein the entry of the one or more sets of traits for the first element is received from more than one operator.

* * * * *